US012767147B2

(12) United States Patent
Kobayashi et al.

(10) Patent No.: US 12,767,147 B2
(45) Date of Patent: Oct. 20, 2026

(54) DRIVER ASSISTANCE APPARATUS, DRIVER ASSISTANCE METHOD, AND RECORDING MEDIUM

(71) Applicant: SUBARU CORPORATION, Tokyo (JP)

(72) Inventors: Shumpei Kobayashi, Tokyo (JP); Hideyuki Takao, Tokyo (JP); Yui Niizeki, Tokyo (JP); Ryo Kikkawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 20 days.

(21) Appl. No.: 18/873,847

(22) PCT Filed: Mar. 23, 2023

(86) PCT No.: PCT/JP2023/011472

§ 371 (c)(1),
(2) Date: Dec. 11, 2024

(87) PCT Pub. No.: WO2024/195104

PCT Pub. Date: Sep. 26, 2024

(65) Prior Publication Data

US 2025/0360930 A1 Nov. 27, 2025

(51) Int. Cl.
*B60W 40/09* (2012.01)
*B60W 50/00* (2006.01)
*B60W 50/14* (2020.01)

(52) U.S. Cl.
CPC ........ *B60W 40/09* (2013.01); *B60W 50/0098* (2013.01); *B60W 2050/0083* (2013.01); *B60W 2556/10* (2020.02)

(58) Field of Classification Search
CPC .................................................... B60W 40/09
See application file for complete search history.

(56) References Cited

U.S. PATENT DOCUMENTS

2017/0202501 A1* 7/2017 Kuwahara ............ G06V 20/597
2017/0282792 A1* 10/2017 Illy ....................... B60W 40/08
2018/0032072 A1* 2/2018 Hoye .................. B60W 50/082

FOREIGN PATENT DOCUMENTS

JP 2004-171060 A 6/2004
JP 2006-268414 A 10/2006
JP 2010231776 A * 10/2010 ............. B06K 35/00

OTHER PUBLICATIONS

International Search Report issued in corresponding International Patent Application No. PCT/JP2023/011472, dated Jun. 13, 2023.

* cited by examiner

*Primary Examiner* — Davetta W Goins
*Assistant Examiner* — Pameshanand Mahase
(74) *Attorney, Agent, or Firm* — Rimon P.C.

(57) ABSTRACT

A driver assistance apparatus executes a target value setting process and an assistance process. In the target value setting process, the driver assistance apparatus sets a target value of at least one vehicle state related to a driving action of a driver in a predetermined driving scene, based on information associated with multiple skill items regarding the driving action of the driver in the predetermined driving scene. In the assistance process, the driver assistance apparatus assists the driver in driving the vehicle, based on the target value. In the target value setting process, the driver assistance apparatus sets the target value, based on information on a result of improvement in a driving skill of the driver owing to past execution of the assistance process for the driver in the predetermined driving scene.

10 Claims, 13 Drawing Sheets

【FIG. 1】
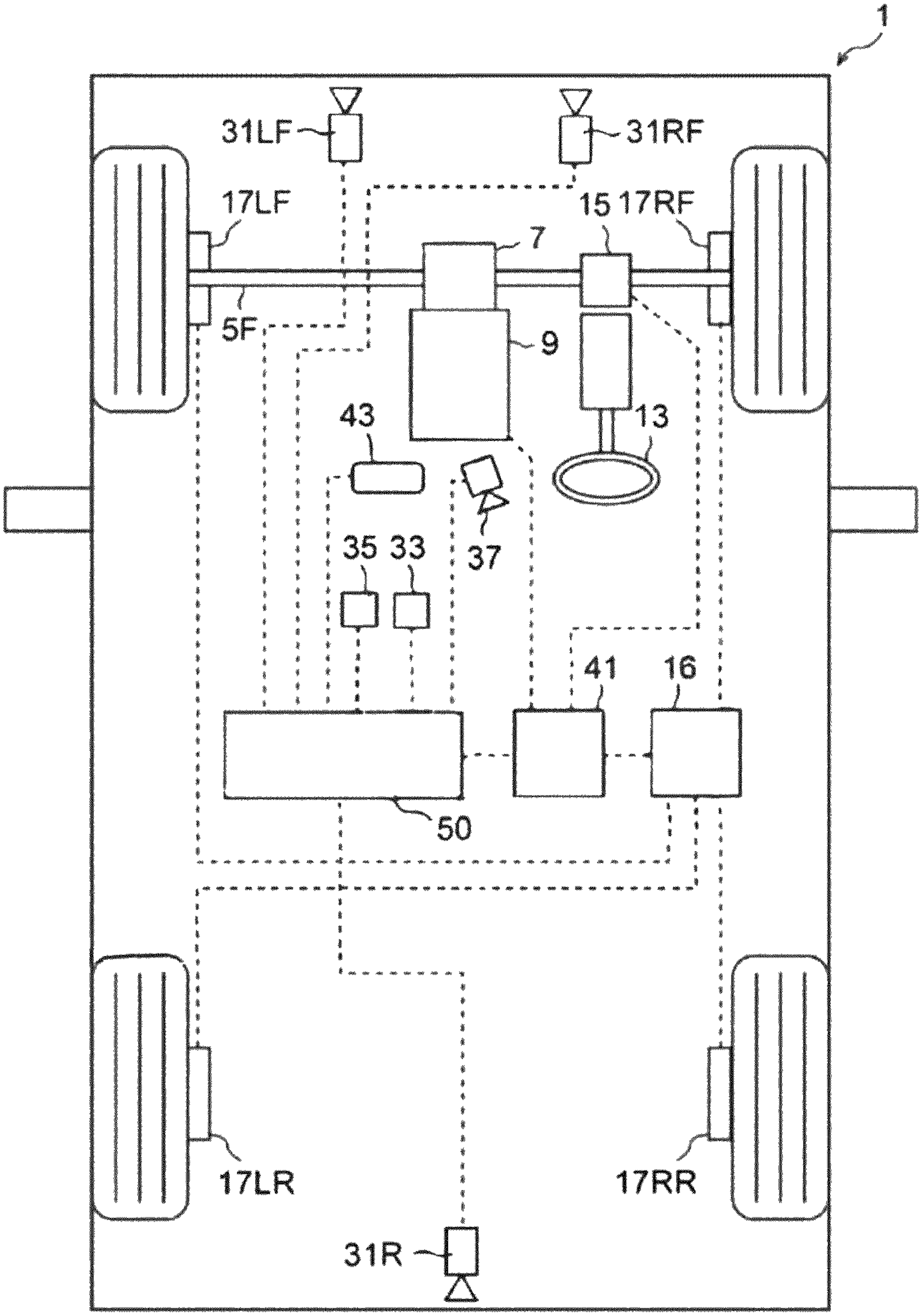

【FIG. 2】
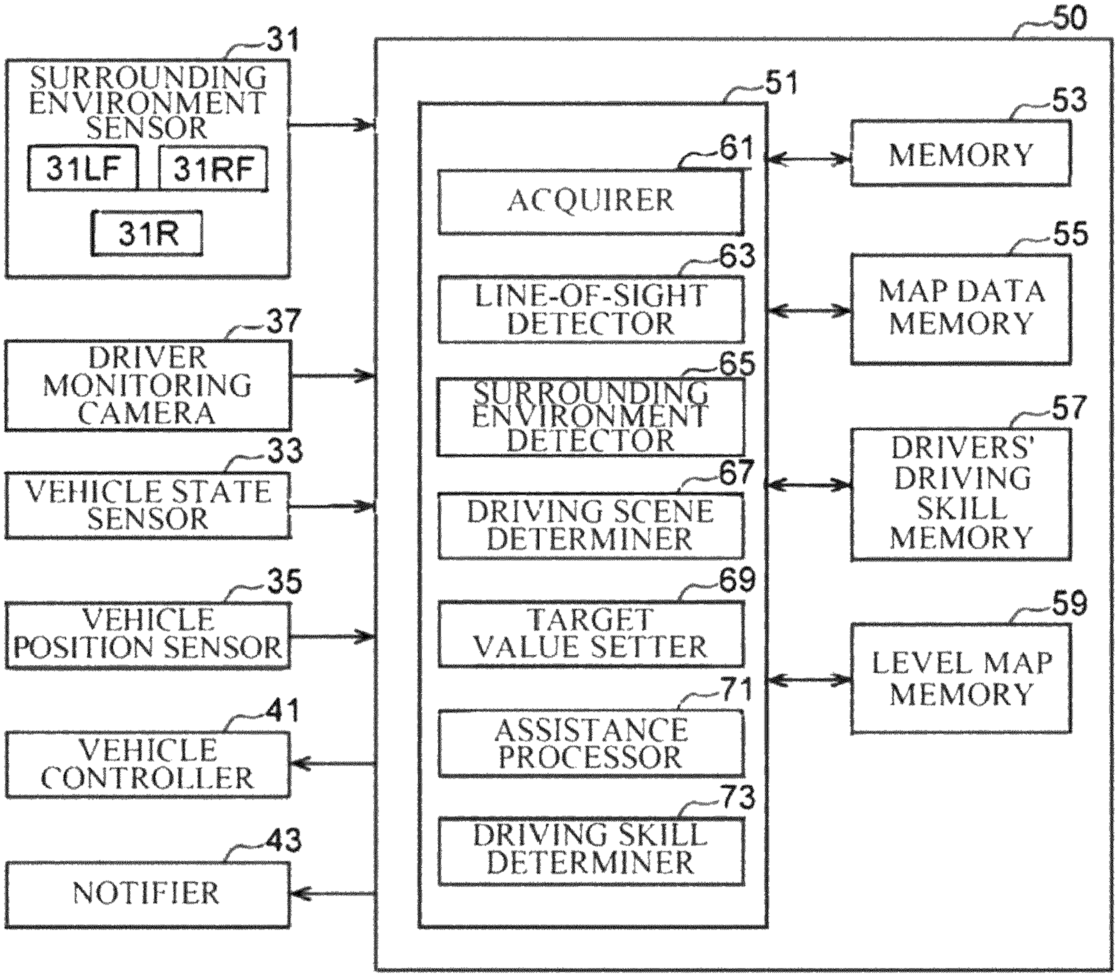
【FIG. 3】
[DRIVER'S ID : NNNNNN]
| DRIVING SCENE | SKILL ITEM | SKILL LEVEL |
|---|---|---|
| LEFT-TURNING AT T-JUNCTION HAVING BLIND SPOT IN RIGHT-TURNING DIRECTION | • VISIBILITY ASSURANCE | 4 |
| | • SMOOTHNESS OF VEHICLE BEHAVIOR | 8 |
| FOLLOWING PRECEDING VEHICLE | • STABILITY OF INTER-VEHICULAR DISTANCE | 6 |
| | • VEHICLE BEHAVIOR | 8 |

[FIG. 4]

DRIVING SCENE: LEFT-TURNING AT T-JUNCTION

| | | VISIBILITY ASSURANCE N | | | | | | | | | |
|---|---|---|---|---|---|---|---|---|---|---|---|
| | | 1 | 2 | 3 | 4 | 5 | 6 | 7 | 8 | 9 | 10 |
| SMOOTHNESS M | 1 | θ_1*1<br>xy_1*1 | θ_2*1<br>xy_2*1 | θ_3*1<br>xy_3*1 | θ_4*1<br>xy_4*1 | θ_5*1<br>xy_5*1 | θ_6*1<br>xy_6*1 | θ_7*1<br>xy_7*1 | θ_8*1<br>xy_8*1 | θ_9*1<br>xy_9*1 | θ_10*1<br>xy_10*1 |
| | 2 | θ_1*2<br>xy_1*2 | θ_2*2<br>xy_2*2 | θ_3*2<br>xy_3*2 | θ_4*2<br>xy_4*2 | θ_5*2<br>xy_5*2 | θ_6*2<br>xy_6*2 | θ_7*2<br>xy_7*2 | θ_8*2<br>xy_8*2 | θ_9*2<br>xy_9*2 | θ_10*2<br>xy_10*2 |
| | 3 | θ_1*3<br>xy_1*3 | θ_2*3<br>xy_2*3 | θ_3*3<br>xy_3*3 | θ_4*3<br>xy_4*3 | θ_5*3<br>xy_5*3 | θ_6*3<br>xy_6*3 | θ_7*3<br>xy_7*3 | θ_8*3<br>xy_8*3 | θ_9*3<br>xy_9*3 | θ_10*3<br>xy_10*3 |
| | 4 | θ_1*4<br>xy_1*4 | θ_2*4<br>xy_2*4 | θ_3*4<br>xy_3*4 | θ_4*4<br>xy_4*4 | θ_5*4<br>xy_5*4 | θ_6*4<br>xy_6*4 | θ_7*4<br>xy_7*4 | θ_8*4<br>xy_8*4 | θ_9*4<br>xy_9*4 | θ_10*4<br>xy_10*4 |
| | 5 | θ_1*5<br>xy_1*5 | θ_2*5<br>xy_2*5 | θ_3*5<br>xy_3*5 | θ_4*5<br>xy_4*5 | θ_5*5<br>xy_5*5 | θ_6*5<br>xy_6*5 | θ_7*5<br>xy_7*5 | θ_8*5<br>xy_8*5 | θ_9*5<br>xy_9*5 | θ_10*5<br>xy_10*5 |
| | 6 | θ_1*6<br>xy_1*6 | θ_2*6<br>xy_2*6 | θ_3*6<br>xy_3*6 | θ_4*6<br>xy_4*6 | θ_5*6<br>xy_5*6 | θ_6*6<br>xy_6*6 | θ_7*6<br>xy_7*6 | θ_8*6<br>xy_8*6 | θ_9*6<br>xy_9*6 | θ_10*6<br>xy_10*6 |
| | 7 | θ_1*7<br>xy_1*7 | θ_2*7<br>xy_2*7 | θ_3*7<br>xy_3*7 | θ_4*7<br>xy_4*7 | θ_5*7<br>xy_5*7 | θ_6*7<br>xy_6*7 | θ_7*7<br>xy_7*7 | θ_8*7<br>xy_8*7 | θ_9*7<br>xy_9*7 | θ_10*7<br>xy_10*7 |
| | 8 | θ_1*8<br>xy_1*8 | θ_2*8<br>xy_2*8 | θ_3*8<br>xy_3*8 | θ_4*8<br>xy_4*8 | θ_5*8<br>xy_5*8 | θ_6*8<br>xy_6*8 | θ_7*8<br>xy_7*8 | θ_8*8<br>xy_8*8 | θ_9*8<br>xy_9*8 | θ_10*8<br>xy_10*8 |
| | 9 | θ_1*9<br>xy_1*9 | θ_2*9<br>xy_2*9 | θ_3*9<br>xy_3*9 | θ_4*9<br>xy_4*9 | θ_5*9<br>xy_5*9 | θ_6*9<br>xy_6*9 | θ_7*9<br>xy_7*9 | θ_8*9<br>xy_8*9 | θ_9*9<br>xy_9*9 | θ_10*9<br>xy_10*9 |
| | 10 | θ_1*10<br>xy_1*10 | θ_2*10<br>xy_2*10 | θ_3*10<br>xy_3*10 | θ_4*10<br>xy_4*10 | θ_5*10<br>xy_5*10 | θ_6*10<br>xy_6*10 | θ_7*10<br>xy_7*10 | θ_8*10<br>xy_8*10 | θ_9*10<br>xy_9*10 | θ_10*10<br>xy_10*10 |

【FIG. 5】
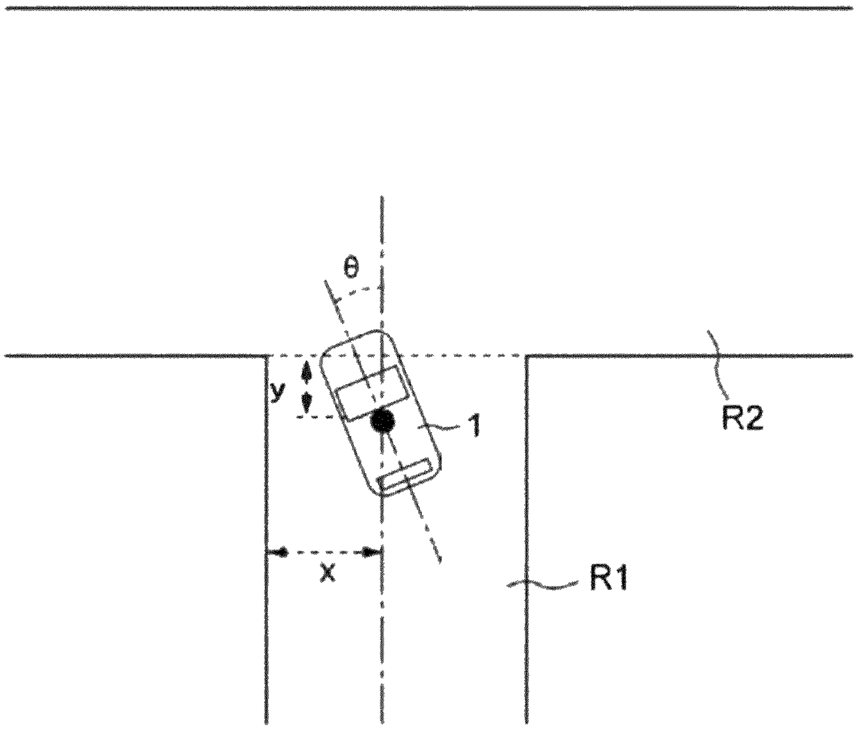
【FIG. 6】
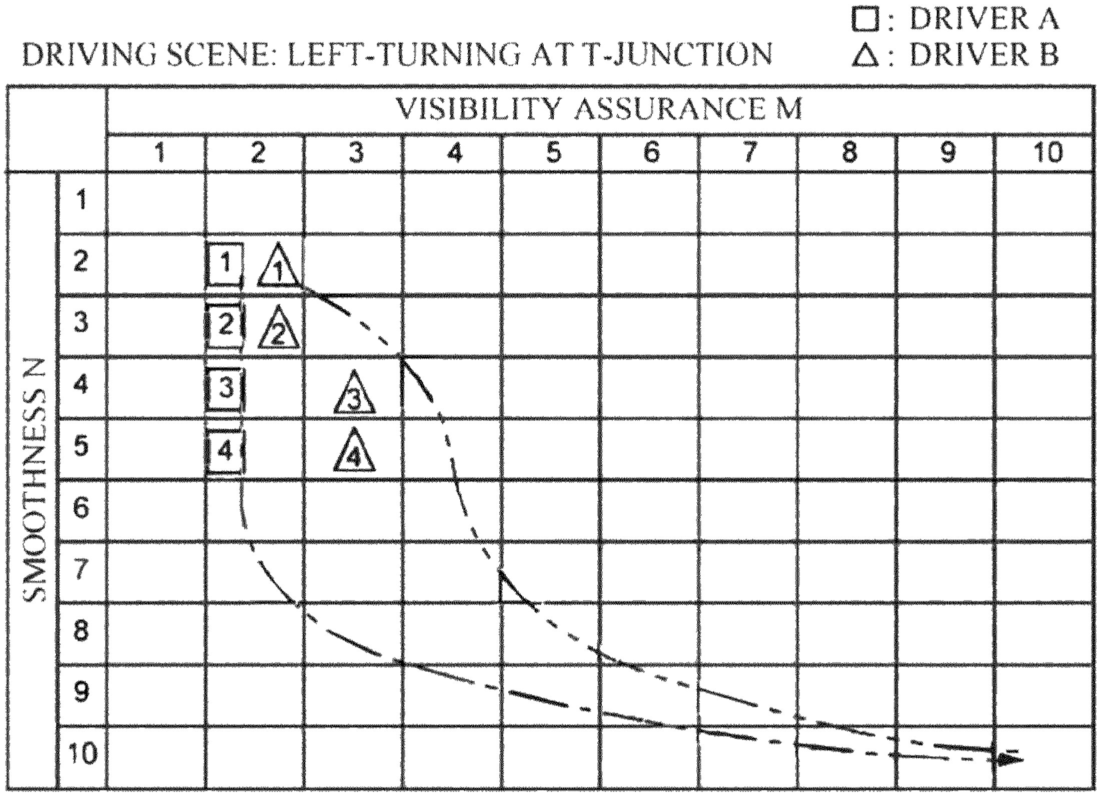

【FIG. 7】
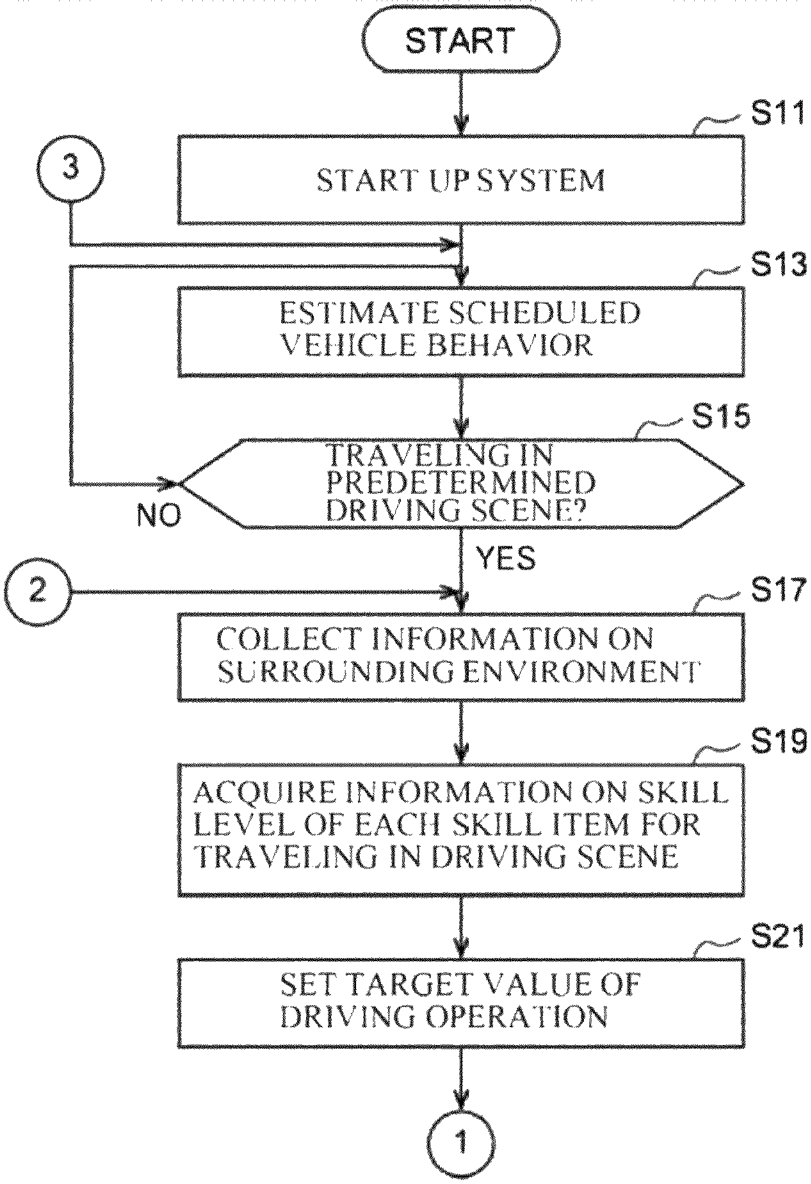

[ FIG. 8 ]
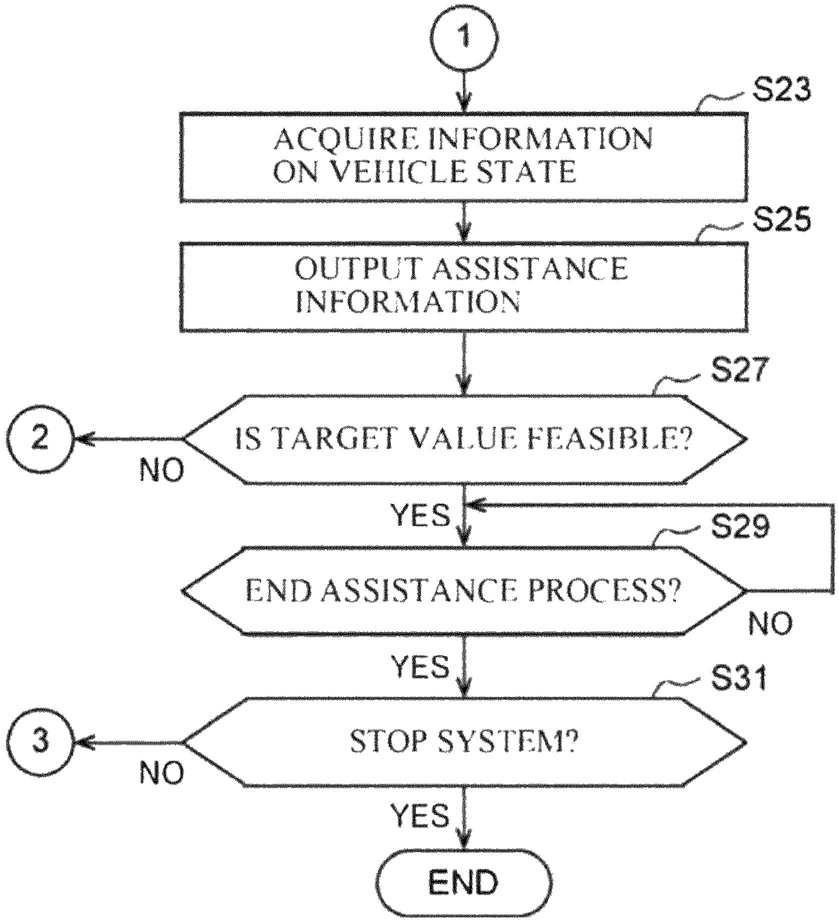

【FIG. 9】
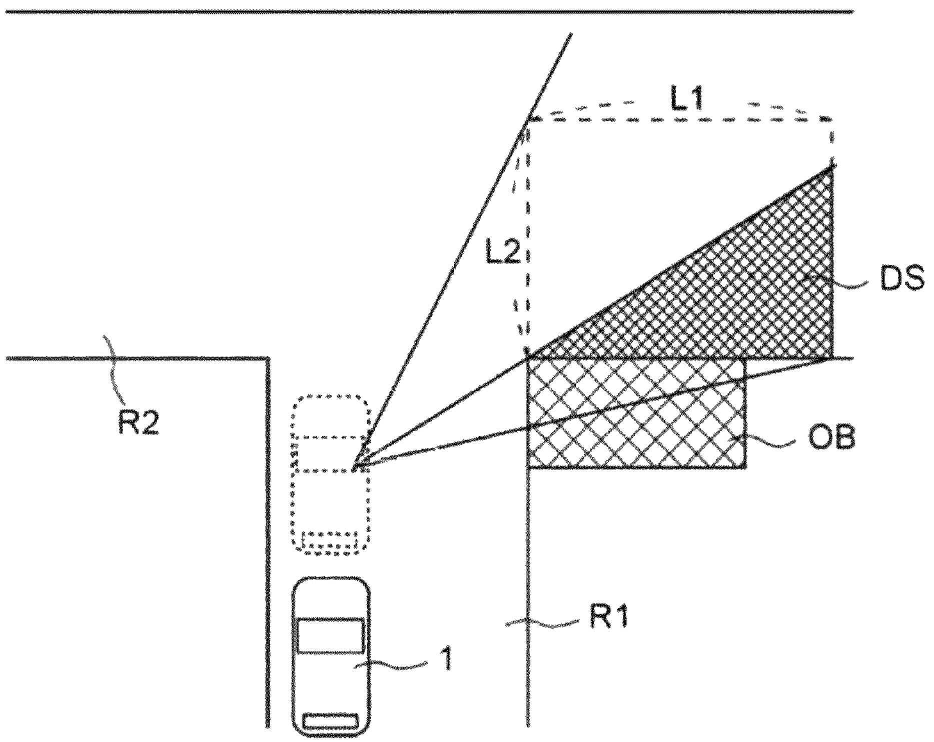

[ FIG. 10 ]
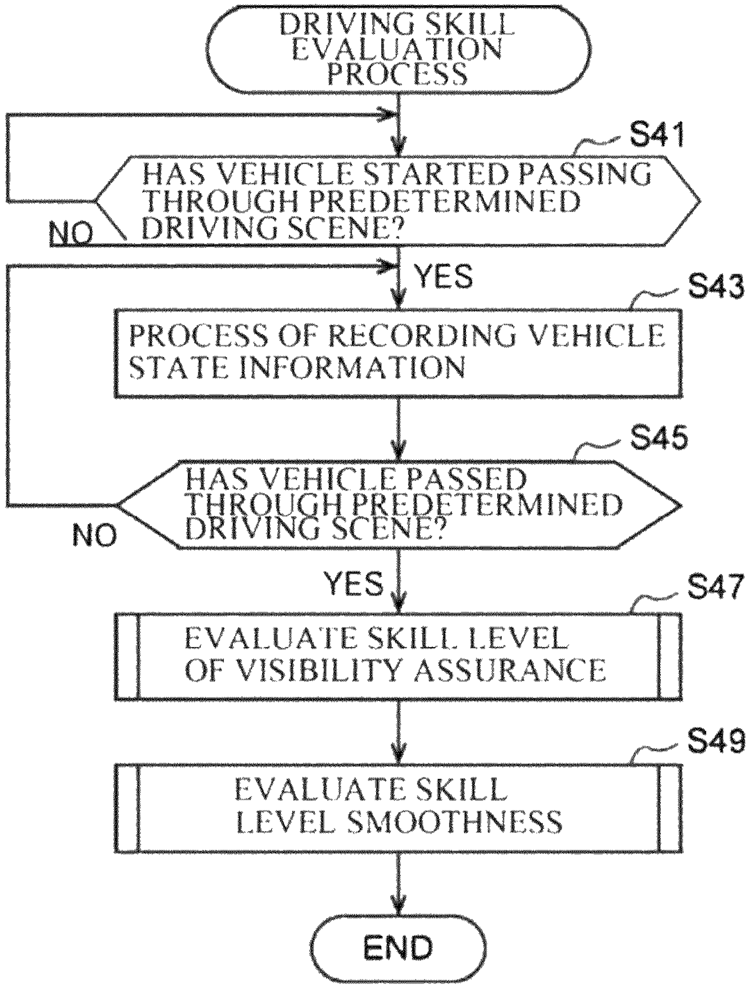

[ FIG. 11 ]
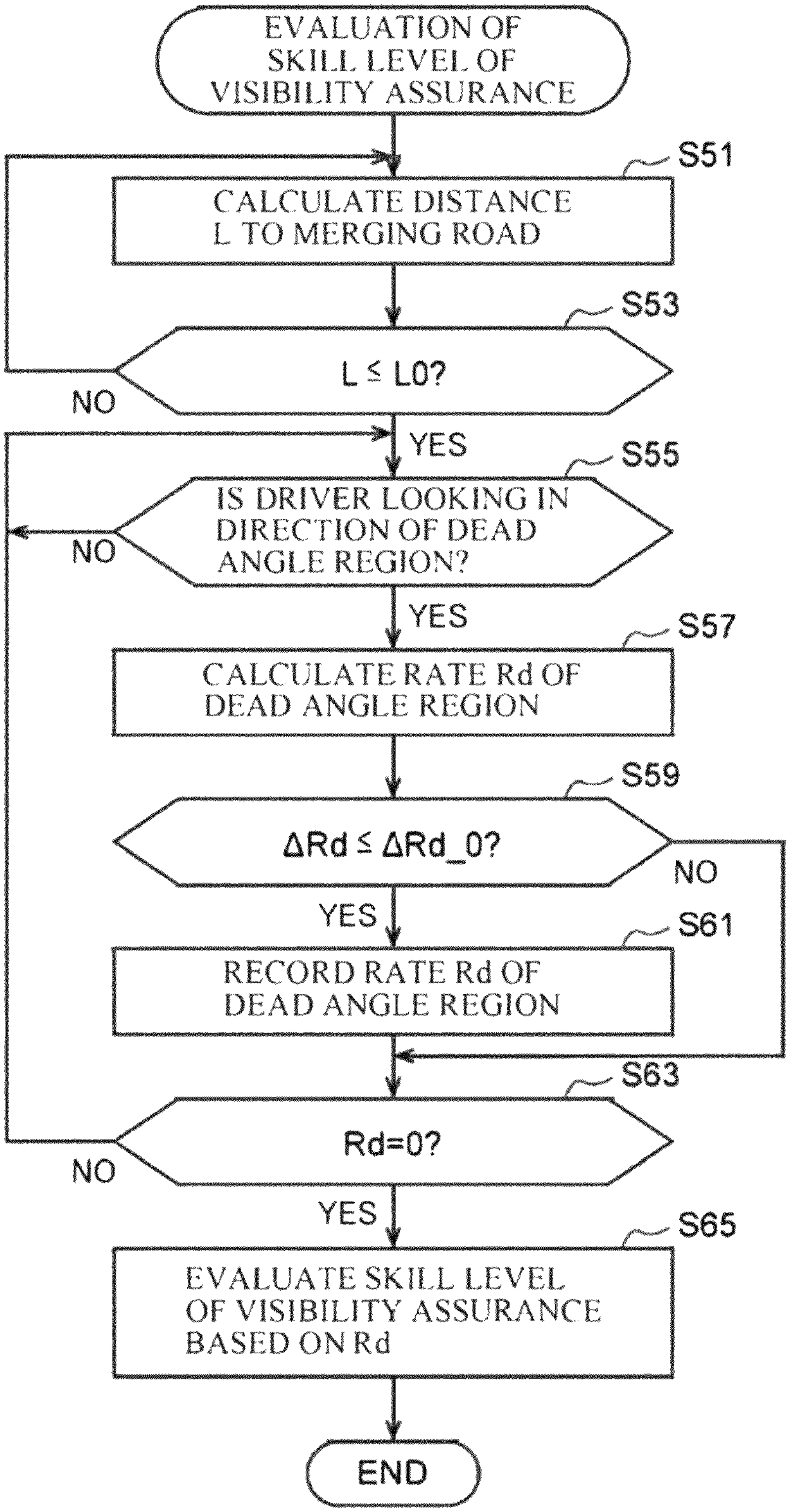

[ FIG. 12 ]
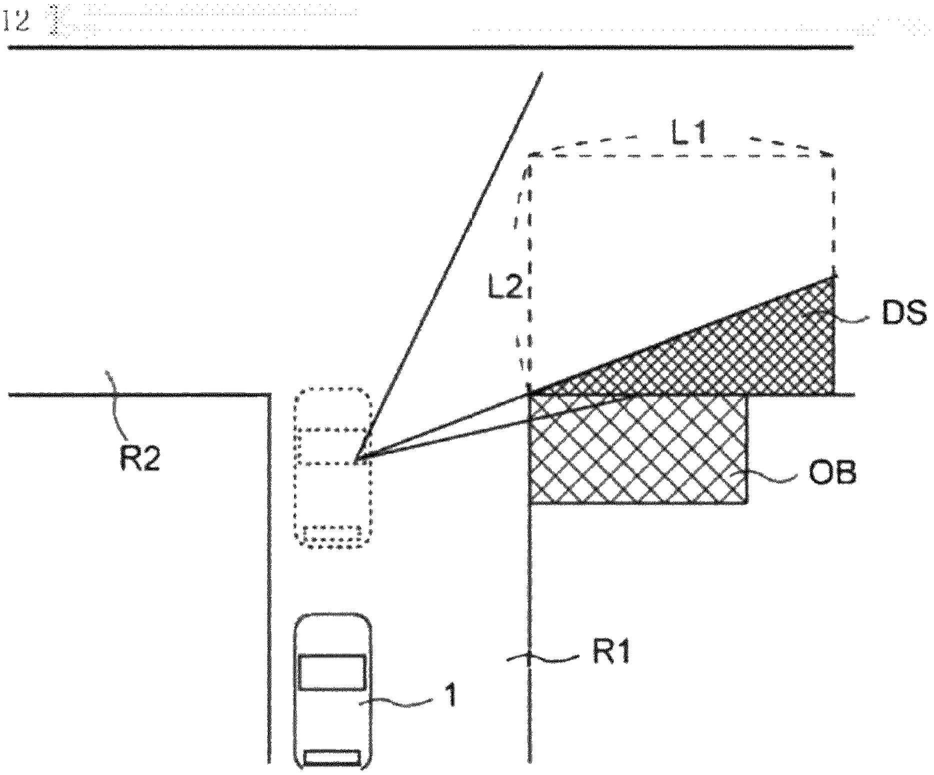
[ FIG. 13 ]
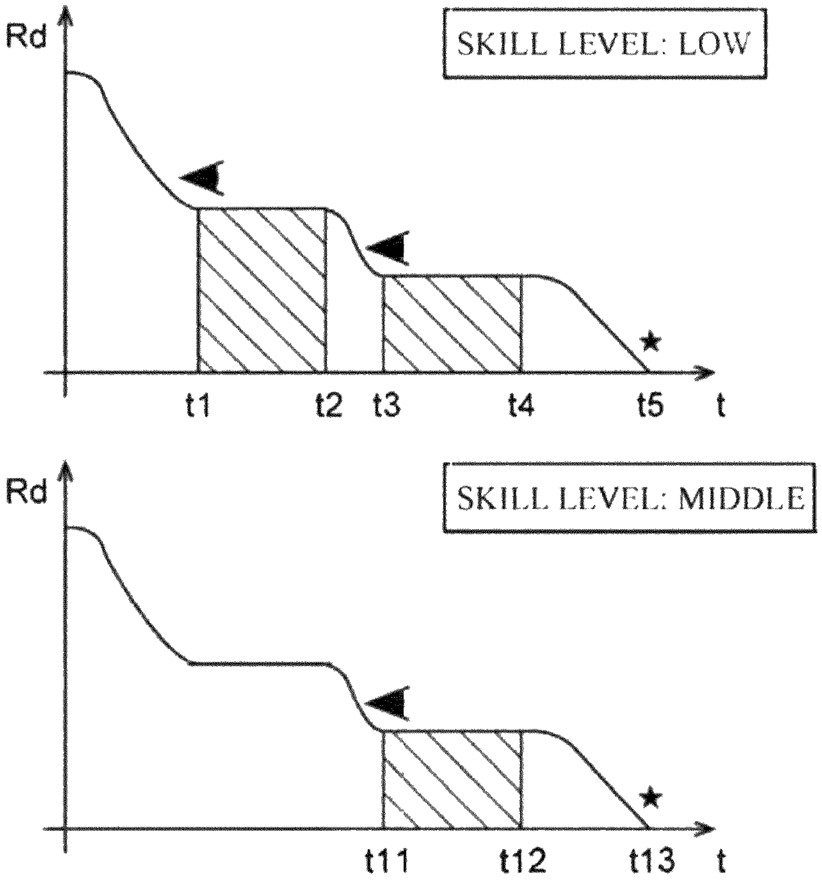

【FIG. 14】
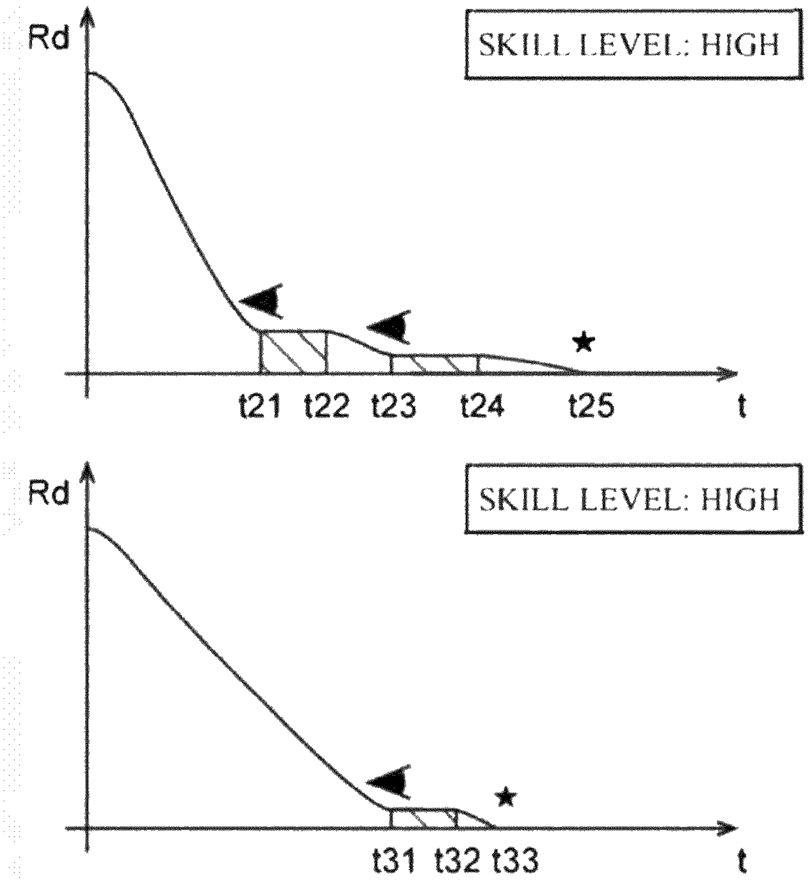
【FIG. 15】
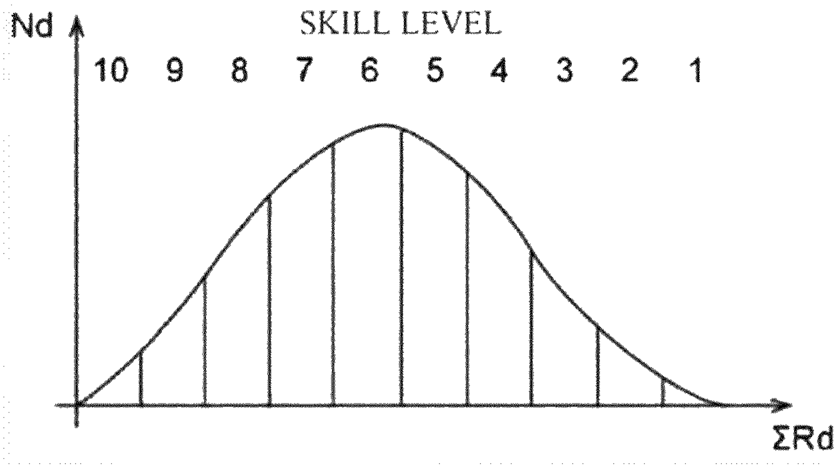

【FIG. 18】
【FIG. 19】
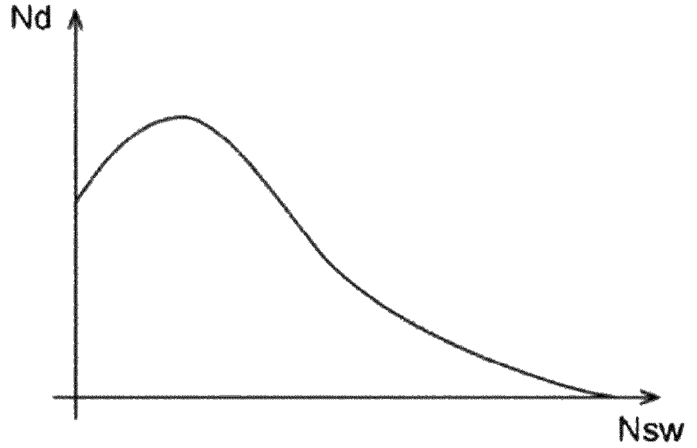
【FIG. 20】
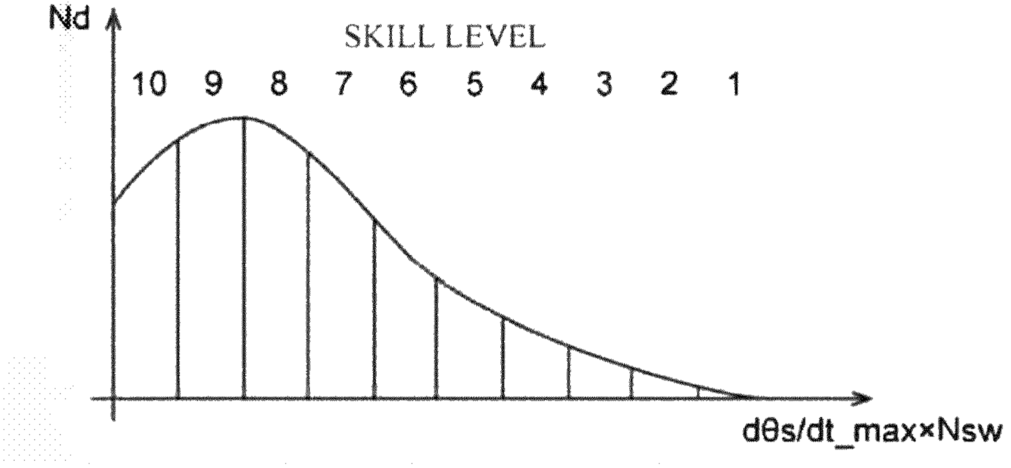

DRIVER ASSISTANCE APPARATUS, DRIVER ASSISTANCE METHOD, AND RECORDING MEDIUM

CROSS-REFERENCE TO RELATED APPLICATIONS

This application is the U.S. National Phase under 35 U.S.C. § 371 of International Application No. PCT/JP2023/011472, filed on Mar. 23, 2023, the entire contents of which are hereby incorporated by reference.

TECHNICAL FIELD

The disclosure relates to a driver assistance apparatus, a driver assistance method, and a recording medium.

BACKGROUND ART

A driver assistance apparatus that assists a driver in driving a vehicle has been known. As one example of the driver assistance apparatus, a driver assistance apparatus designed to improve driving skills of drivers has been known.

For example, Patent Literature 1 proposes a driver assistance apparatus that assists a driver in performing a driving operation in accordance with a skill of the driver. Specifically, the driver assistance apparatus disclosed in Patent Literature 1 includes a monitoring processor, a determination processor, an assistance processor, a driver's level memory, and a processing content setter. The monitoring processor monitors a state of an own vehicle and a surrounding condition around the own vehicle, based on: outputs from a road information collector, a speed sensor, an acceleration sensor, a camera, a vehicle-to-vehicle communicator, a radar, a lighting system, and a vehicle control system; and position information and map data outputted from a navigator. The determination processor determines whether to execute driver assistance, based on a result of monitoring. The assistance processor executes the driver assistance of the vehicle. The driver's level memory holds information on the skill of the driver. The processing content setter changes content of the processing to be performed by the monitoring processor, the determination processor, and the assistance processor, based on the skill of the driver.

Patent Literature 2 proposes a driver assistance apparatus configured to achieve safety driver assistance in accordance with driving skill levels of drivers or driving states of the drivers. Specifically, the driver assistance apparatus disclosed in Patent Literature 2 is an apparatus to be applied to a vehicle and includes an administration unit and a first assistance unit. The administration unit holds information regarding the drivers of the vehicle associated with driving attributes categorized according to the driving skill levels or the like. The first assistance unit holds training information that improves the driving skill for each driving attribute, and outputs the training information corresponding to the driving attribute of the driver, based on a traveling state of the vehicle during driving of the vehicle by the driver.

Citation List

Patent Literature

Patent Literature 1: Japanese Unexamined Patent Application Publication No. 2006-268414

Patent Literature 2: Japanese Unexamined Patent Application Publication No. 2004-171060

SUMMARY OF INVENTION

Problem to be Solved by the Invention

A driver who drives a vehicle is generally to perform multiple driving actions in one driving scene. For example, in a driving scene where the vehicle turns left at a T-junction with a dead angle corner to merge into a merging road, it is desirable for a driver assistance apparatus to perform driver assistance that allows both a smooth left-turning operation and visibility assurance of the merging road to be achieved. The driver assistance apparatus makes it possible to achieve appropriate driver assistance by performing the driver assistance, based on learning data including data on driving operations of skilled drivers having high-level driving skills.

However, if the driver assistance is executed based on the learning data on the driving operations of the skilled drivers for a driver who has a difficulty in achieving both the smooth driving operation and the visibility assurance, the driver can pay excessive attention to the driver assistance because the level of difficulty of content of the assistance is too high for the driver. This can reduce the drivers' attention to other traffic environments.

The disclosure has been made in view of the above-described issues, and an object of the disclosure is to provide a driver assistance apparatus, a driver assistance method, and a recording medium that each make it possible to execute appropriate driver assistance taking into consideration a state of improvement in driving skill of a driver who drives a vehicle.

Means for Solving the Problem

To address the above-described issue, an aspect of the disclosure provides a driver assistance apparatus configured to assist a driver in driving a vehicle. The driver assistance apparatus includes one or more processors and one or more memories communicably coupled to the one or more processors. The one or more processors are configured to execute a target value setting process and an assistance process. In the target value setting process, the one or more processors are configured to set a target value of at least one vehicle state related to a driving action of the driver in a predetermined driving scene, based on information associated with multiple skill items regarding the driving action of the driver in the predetermined driving scene and. In the assistance process, the one or more processors are configured to assist the driver in driving the vehicle, based on the target value. In the target value setting process, the one or more processors are configured to set the target value, based on information on a result of improvement in a driving skill of the driver owing to past execution of the assistance process for the driver in the predetermined driving scene.

To address the above-described issues, another aspect of the disclosure provides a driver assistance method of assisting a driver in driving a vehicle. The driver assistance method includes: assisting, with one or more processors, the driver in driving the vehicle by setting a target value of at least one vehicle state related to a driving action of the driver in a predetermined driving scene, based on information associated with multiple skill items regarding the driving action of the driver in the predetermined driving scene; and setting, with the one or more processors, the target value, based on information on a result of improvement in a driving skill of the driver owing to past execution of the assistance process for the driver in the predetermined driving scene.

To address the above-described issues, still another aspect of the disclosure provides a non-transitory tangible recording medium containing a computer program. The computer program causes one or more processors to: assist the driver in driving the vehicle by setting a target value of at least one vehicle state related to a driving action of a driver who drives a vehicle in a predetermined driving scene, based on information associated with multiple skill items regarding the driving action of the driver in the predetermined driving scene; and set the target value, based on information on a result of improvement in a driving skill of the driver owing to past execution of the assistance process for the driver in the predetermined driving scene.

Effects of the Invention

According to the disclosure described above, it is possible to enhance reliability of a driver assistance functionality by performing logical operation of a degree of danger in various possible situations of a vehicle.

BRIEF DESCRIPTION OF DRAWINGS

FIG. 1 is a schematic diagram illustrating a configuration example of a vehicle including a driver assistance apparatus according to one embodiment of the disclosure.

FIG. 2 is a block diagram illustrating a configuration example of the driver assistance apparatus according to the embodiment.

FIG. 3 is an explanatory diagram illustrating an example of information on a driving skill of a driver according to the embodiment.

FIG. 4 is an explanatory diagram illustrating an example of a level map according to the embodiment.

FIG. 5 is an explanatory diagram illustrating a driving scene of left-turning at a T-junction.

FIG. 6 is an explanatory diagram illustrating information on results of improvement in driving skill owing to a driver assistance process according to the embodiment.

FIG. 7 is a flowchart of an example of the driver assistance process to be performed by the driver assistance apparatus according to the embodiment.

FIG. 8 is a flowchart of the example of the driver assistance process to be performed by the driver assistance apparatus according to the embodiment.

FIG. 9 is an explanatory diagram illustrating a rate of a dead angle region according to the embodiment.

FIG. 10 is a flowchart of an example of a driving skill evaluation process to be performed by the driver assistance apparatus according to the embodiment.

FIG. 11 is a flowchart of an example of a process of evaluating a skill level of visibility assurance to be performed by the driver assistance apparatus according to the embodiment in the driving scene of left-turning at the T-junction.

FIG. 12 is an explanatory diagram illustrating a difference between the rates of dead angle region as seen from different positions of the vehicle.

FIG. 13 is an explanatory diagram illustrating a viewing behavior of a driver having a low skill level of visibility assurance.

FIG. 14 is an explanatory diagram illustrating a viewing behavior of a driver having a high skill level of the visibility assurance.

FIG. 15 is an explanatory diagram illustrating distribution data on an integrated value of the rates of dead angle region in a time period in which the drivers made the viewing behaviors when turning at the T-junction.

FIG. 18 is an explanatory diagram illustrating distribution data on a maximum steering angular velocity in a steering operation performed in the time period from the start of turning to the end of turning.

FIG. 19 is an explanatory diagram illustrating distribution data on the number of times of steering correction in the steering operation performed in the time period from the start of turning to the end of turning.

FIG. 20 is an explanatory diagram illustrating distribution data on a value obtained by multiplying the maximum steering angular velocity by the number of times of steering correction.

MODES FOR CARRYING OUT THE INVENTION

Figure 16:
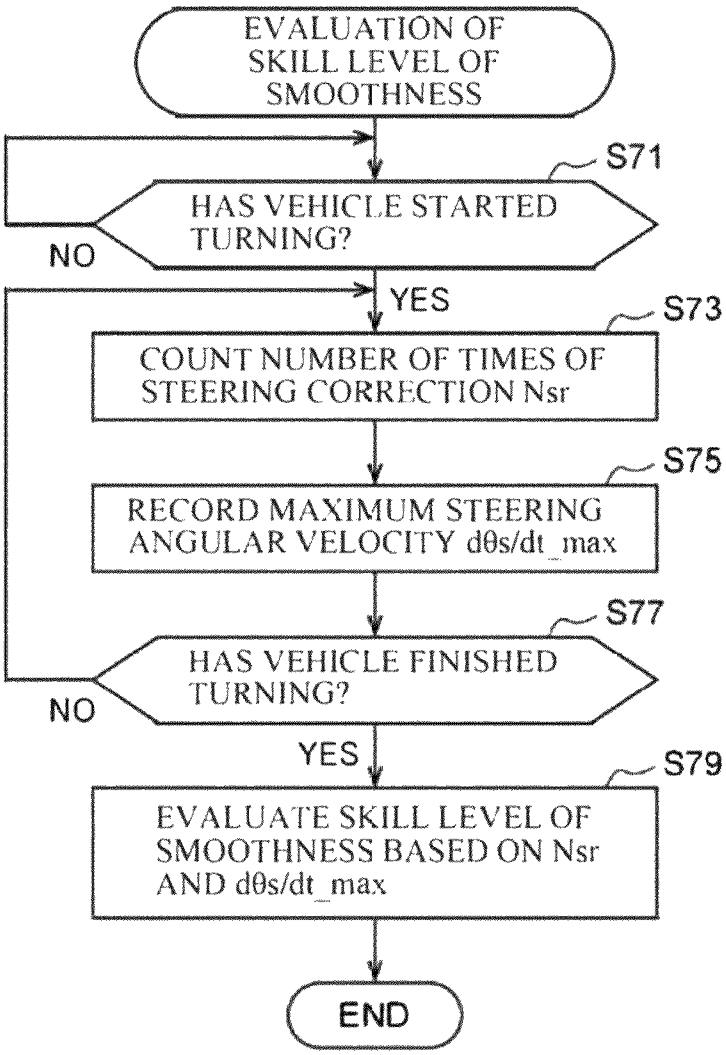
FIG. 16 is a flowchart illustrating an example of a process of evaluating a skill level of smoothness in the driving scene of left-turning at the T-junction.

In the following, some preferred embodiments of the disclosure are described in detail with reference to the accompanying drawings. Throughout the present description and the drawings, elements having substantially the same function and configuration are denoted with the same reference numerals to avoid any redundant description.

In the following description, a driver assistance apparatus has a functionality of a danger prediction device according to the disclosure.

1. Overall Configuration of Vehicle

A description is given first of an example of an overall configuration of a vehicle including a driver assistance apparatus according to an embodiment of the disclosure.

FIG. 1 is a schematic diagram illustrating a configuration example of a vehicle 1.

The vehicle 1 is a two-wheel drive automobile having four wheels and is configured to transmit driving torque outputted from a driving power source 9 that generates the driving torque to a left-front wheel and a right-front wheel. The driving power source 9 may be an internal combustion engine such as a gasoline engine or a diesel engine. Alternatively, the driving power source 9 may be a drive motor. Still alternatively, the driving power source 9 may include both of an internal combustion engine and a drive motor.

Note that the vehicle 1 may be a four-wheel drive automobile configured to transmit the driving torque to the front wheels and the rear wheels. Alternatively, the vehicle 1 may be an electric automobile including two drive motors, e.g., a front-wheel driver motor and a rear-wheel drive motor. Still alternatively, the vehicle 1 may be an electric vehicle including respective drive motors for the wheels. In a case where the vehicle 1 is an electric automobile or a hybrid electric automobile, the vehicle 1 includes a power generator, such as a secondary battery that holds electric power to be supplied to the drive motors, a motor that generates electric power with which the battery is to be charged, or a fuel battery.

The vehicle 1 includes devices to be used to control driving of the vehicle 1, such as the driving power source 9, an electric steering device 15, and braking devices 17LF, 17RF, 17LR, and 17RR (hereinafter collectively referred to as "braking devices 17" when these are not to be particularly distinguished from one another). The driving power source 9 outputs driving torque to be transmitted to a front-wheel drive shaft 5F via a non-illustrated transmission and a differential mechanism 7. Driving of the driving power source 9 and driving of the transmission are controlled by a vehicle controller 41 including one or more electronic control units (ECUs).

The front-wheel drive shaft 5F is provided with an electric steering device 15. The electric steering device 15 includes a non-illustrated electric motor and a non-illustrated gear mechanism. The electric steering device 15 adjusts steered angles of the front wheels under control of the vehicle controller 41. During manual driving, the vehicle controller 41 controls the electric steering device 15, based on a steering angle of a steering wheel 13 operated by a driver. During automated driving, the vehicle controller 41 controls the electric steering device 15, based on a set steering angle or a set steering angular velocity.

The braking devices 17LF, 17RF, 17LR, and 17RR apply a braking force to the respective wheels. The braking devices 17 are, for example, hydraulic friction braking devices. The vehicle controller 41 adjusts a hydric pressure to be supplied to each of the braking devices 17 by controlling driving of a hydraulic pressure unit 16. In a case where the vehicle 1 is an electric automobile or a hybrid electric automobile, the braking devices 17 are used in combination with regenerative braking generated by a drive motor.

The vehicle controller 41 includes the one or more ECUs that control driving of the driving power source 9, driving of the electric steering device 15, and driving of the hydraulic pressure unit 16. In a case where the vehicle 1 includes the transmission that changes an output received from the driving power source 9 and transmits the changed output to the wheels 3, the vehicle controller 41 has a functionality of controlling driving of the transmission.

The vehicle 1 further includes front imaging cameras 31LF and 31RF, a rear imaging camera 31R, a vehicle state sensor 33, a vehicle position sensor 35, a driver monitoring camera 37, and a notifier 43.

The front imaging cameras 31LF and 31RF and the rear imaging camera 31R constitute a surrounding environment sensor that acquires information on a surrounding environment of the vehicle 1. The front imaging cameras 31LF and 31RF each capture an image of an area ahead of the vehicle 1 and generate image data. The rear imaging camera 31R captures an image of an area behind the vehicle 1 and generates image data. The front imaging cameras 31LF and 31RF and the rear imaging camera 31R each include an imaging device such as a charged coupled device (CCD) or a complementary metal oxide semiconductor (CMOS) and transmit the generated image data to a driver assistance apparatus 50. The vehicle 1 illustrated in FIG. 1 includes the front imaging cameras 31LF and 31RF that are left and right cameras paired into a stereo camera. Alternatively, the front imaging cameras 31LF and 31RF are monocular cameras.

Note that the surrounding environment sensor may include, for example, a camera disposed on a left side mirror to capture an image of a left-side area of the vehicle 1 and a camera disposed on a right side mirror to capture an image of a right-side area of the vehicle 1, in addition to the front imaging cameras 31LF and 31RF and the rear imaging camera 31R. The surrounding environment sensor may further include one or more sensors of a radar sensor such as a light detection and ranging (LiDAR) sensor or a millimeter wave radar, and an ultrasonic sensor.

The vehicle state sensor 33 includes at least one sensor that detects an operational state and a behavior of the vehicle 1. The vehicle state sensor 33 may include one or more of a steering angle sensor, an accelerator position sensor, a brake stroke sensor, a brake pressure sensor, and an engine rotation sensor, for example. The vehicle state sensor 33 includes one or more of a vehicle speed sensor, an acceleration sensor, and an angular velocity sensor, for example. The vehicle state sensor 33 further includes a switch that detects on/off states of a direction indicator. The vehicle state sensor 33 may transmit a sensor signal indicating detected information to the driver assistance apparatus 50.

The vehicle position sensor 35 receives satellite signals from positioning satellites of a global navigation satellite system (GNSS) such as the global positioning system (GPS). The vehicle position sensor 35 transmits position information on the vehicle 1 included in the received satellite signals to the driver assistance apparatus 50. Note that the vehicle position sensor 35 may be an antenna that receives satellite signals from another satellite system that identifies the position of the vehicle 1, rather than a GPS sensor.

The driver monitoring camera 37 captures an image of a driver who drives the vehicle 1, and generates image data. The driver monitoring camera 37 includes an imaging device such as a CCD or a CMOS and transmits the generated image data to the driver assistance apparatus 50.

The notifier 43 is driven by the driver assistance apparatus 50 and notifies the driver of various kinds of information by means of image displaying or sound outputting, for example. The notifier 43 includes a display disposed in an instrument panel and a speaker disposed in the vehicle 1, for example. The display may be a display of a navigation system. Alternatively, the notifier 43 may be a head-up display (HUD) that displays an image on a windshield.

2. Driver Assistance Apparatus

Next, a specific description will be given of the driver assistance apparatus 50 according to the present embodiment.

2-1. Configuration Example

The driver assistance apparatus 50 serves as an apparatus that assists driving of the vehicle by executing a computer program with one or more processors such as central processing units (CPUs). The computer program causes the one or more processors to perform a later-described operation to be performed by the driver assistance apparatus 50. The computer program to be executed by the one or more processors may be held in a memory 53 of the driver assistance apparatus 50. Alternatively, the computer program may be held in a recording medium incorporated in the driver assistance apparatus 50. Still alternatively, the computer program may be held in a recording medium externally attachable to the driver assistance apparatus 50.

Examples of the recording medium holding the computer program may include: a magnetic medium such as a hard disk, a floppy disk, or a magnetic tape; an optical recording medium such as a CD-ROM, a DVD, or Blu-ray (registered trademark); a magneto-optical medium such as a floptical disk; a memory such as a RAM or a ROM; a flash memory such as a USB memory or an SSD; and another media configured to hold a program.

FIG. 2 is a block diagram illustrating a configuration example of the driver assistance apparatus 50 according to the present embodiment.

The surrounding environment sensor 31, the driver monitoring camera 37, the vehicle state sensor 33, and the vehicle position sensor 35 are coupled to the driver assistance apparatus 50 via a dedicated line or a communication means such as a controller area network (CAN) or a local interconnect network (LIN). Further, the vehicle controller 41 and the notifier 43 are coupled to the driver assistance apparatus 50. Note that the driver assistance apparatus 50 is not limited to an electronic control unit mounted in the vehicle 1, and may be a terminal device such as a smartphone or a wearable device.

The driver assistance apparatus 50 includes a processor 51, a memory 53, a map data memory 55, a drivers' driving skill memory 57, and a level map memory 59. The processor 51 includes one or more processors such as CPUs and various peripheral components. All or a part of the processor 51 may be updatable software such as firmware, or may be a program module to be executed in accordance with a command from the CPU, for example.

Memory

The memory 53 includes one or more memories such as random access memories (RAMs) or read only memories (ROMs) communicably coupled to the processor 51. However, the memory 53 is not particularly limited in kind or number. The memory 53 may hold a computer program to be executed by the processor 51, various parameters to be used in calculation processing, detection data, and information on results of the calculation processing. A part of the memory 53 is used as a work area of the processor 51.

Map Data Memory

The map data memory 55 is a memory such as a RAM or a ROM or a recording medium such as an HDD, a CD, a DVD, an SSD, a USB flash, or a storage device communicably coupled to the processor 51. The map data held in the map data memory 55 include information allowing for identification of the position of the vehicle 1 that is based on the position information detected by the vehicle position sensor 35. For example, the map data may be associated with information on a latitude and a longitude, and the processor 51 is configured to identify the position of the vehicle 1 on the map data, based on the information on the latitude and the longitude of the vehicle 1 detected by the vehicle position sensor 35.

Drivers' Driving Skill Memory

The drivers' driving skill memory 57 is a memory such as a RAM or a ROM or a recording medium such as an HDD, a CD, a DVD, an SSD, a USB flash, or a storage device, communicably coupled to the processor 51. The drivers' driving skill memory 57 holds information on a driving skill of the driver who drives the vehicle 1. Specifically, the drivers' driving skill memory 57 holds a level of the driving skill of the driver for one or more driving actions to be performed in a predetermined driving scene set as desired. The one or more driving actions to be performed in the predetermined driving scene are each referred to as a "skill item". The level of the driving skill of the driver for each skill item is referred to as a "skill level".

FIG. 3 illustrates an example of the information on driving skill of the driver held in the drivers' driving skill memory 57.

The information on driving skill of the driver is associated with corresponding identification data of the driver (driver ID), and includes information on the skill level of each skill item set for each driving scene.

In a driving scene of left-turning at a T-junction, for example, the driver who drives the vehicle 1 performs a driving operation to decelerate the vehicle 1 and make a temporal stop of the vehicle 1 before entering the merging road, drive the vehicle 1 slowly while confirming safety by visually checking a blind spot or the like, and merge the vehicle 1 into the merging road. In this driving scene, for example, visuality assurance and smoothness of the behavior of the vehicle 1 are set as two skill items, and the skill levels of these skill items are recorded. The visuality assurance refers to an index of viewability of the merging road as seen from the driver. The smoothness refers to an index indicating a state where a necessary amount of a steering operation to be generated upon turning is small or a state where an unstable steering operation or a jerk is small.

In a driving scene where the vehicle 1 is manually driven to follow a preceding vehicle, the driver who drives the vehicle 1 performs a driving operation to cause the vehicle 1 to follow the preceding vehicle while making a stable vehicle behavior and keeping an inter-vehicular distance from changing. In this driving scene, for example, stability of an inter-vehicular distance and a vehicle behavior are set as two skill items, and the skill levels of these skill items are recorded. The stability of the inter-vehicular distance refers to an index representing a state where an amount of temporal change in inter-vehicular distance is small. The vehicle behavior refers to an index representing a state where a jerk generated in longitudinal acceleration is small.

The information on the driving skill of the driver may further include information on skill levels of individual drivers regarding skill items to be performed in each driving scene set as desired.

In the present embodiment, the skill level is indicated on a scale of 1 to 10, with closer to 10 indicating a higher level. However, the index of the skill level is not limited to the above-described example. The skill level is obtained as a result of an evaluation process performed by a driving skill determiner 73 that will be described later, and recorded in the drivers' driving skill memory 57.

Level Map Memory

The level map memory 59 is a memory such as a RAM or a ROM or a recording medium such as an HDD, a CD, a DVD, an SSD, a USB flash, or a storage device communicably coupled to the processor 51. The level map memory 59 holds a level map. The level map is information in which a target value of at least one vehicle state related to a driving action of the driver is set associated with multiple skill items regarding the driving action of the driver for each predetermined driving scene. In the present embodiment, the level map is prepared for each predetermined driving scene and includes information on a target value of the vehicle state set in accordance with the level of the skill item of the driver.

FIG. 4 illustrates an example of the level map to be used in the driving scene of left-turning at the T-junction with the blind spot in a right-turning direction. Recorded in the level map are an inclination of the vehicle 1 in a longitudinal direction with respect to an extending direction of a traveling road and a position of the vehicle 1 that were measured when the vehicle 1 made a temporal stop before entering the merging road from the traveling road. The position of the vehicle 1 may be the center of gravity of the vehicle 1 or any position set on a central portion of a frontal edge of the vehicle 1, for example.

The level map has a horizontal axis indicating a skill level N (1 to 10) of the skill item of the visibility assurance, and a vertical axis indicating a skill level M (1 to 10) of the skill item of the smoothness of the vehicle behavior. Indicated in each cell where the skill levels of these two skill items intersect with each other are an average value of inclinations θ of the vehicle 1 and an average value of positions xy of the vehicle 1 in the past driving operations by the drivers belonging to the respective skill levels.

As illustrated in FIG. 5, the inclination θ of the vehicle 1 indicates the inclination θ of the vehicle 1 in the longitudinal direction with respect to an extending direction of a traveling road R1 at the time of a temporal stop before merging of the vehicle 1 from the traveling road R1 into a merging road R2, and the position xy of the vehicle 1 indicates a distance x from a left end of the traveling road R1 and a distance y from a boundary between the traveling road R1 and the merging road R2 at the time of the temporal stop. Note that the inclination θ and the position xy of the vehicle 1 may be set to any values.

As described in the example, recorded in the level map is an average value of one or more predetermined vehicle states in the driving scene caused by the drivers belonging to the respective skill levels of the skill items to be performed in the driving scene. The level map illustrated in the example of FIG. 4 is a two-dimensional map in which the average values of the vehicle states in terms of the two skill items are recorded. However, the level map may be a multi-dimensional map generated in terms of the skill levels of three or more skill items.

The level map memory 59 holds the information on the skill levels before the execution of the driver assistance according to the disclosure and the information on the skill levels after the execution of the driver assistance according to the disclosure in association with the level map of a predetermined driving scene. The information on the skill levels before the execution of the driver assistance according to the disclosure indicates the skill levels of the driver before driving in the predetermined driving scene using the driver assistance. The information on the skill levels after the execution of the driver assistance indicates the skill levels of the driver evaluated based on the information on the vehicle states in driving in the predetermined driving scene using the driver assistance. Accordingly, the information held in the level map memory 59 includes information on results of improvement in driving skill in the predetermined driving scene owing to the past execution of the driver assistance process for the driver.

FIG. 6 is a diagram illustrating the information on the results of improvement in driving skill owing to the past execution of the driver assistance process for the drivers. Each symbol □ in the level map indicates the number of times of execution of the driver assistance process for a driver A and the information on the skill level after the execution of the driver assistance process. Each symbol △ in the level map indicates the number of times of execution of the driver assistance process for a driver B and the information on the skill level after the execution of the driver assistance process. FIG. 6 illustrates the results of improvement in driving skills of the drivers A and B after four-times of execution of the driver assistance process for each of the drivers A and B.

2-2. Configuration of Processor

Next, a description will be given of a configuration of the processor 51 of the driver assistance apparatus 50. The processor 51 includes an acquirer 61, a line-of-sight detector 63, a surrounding environment detector 65, a driving scene determiner 67, a target value setter 69, an assistance processor 71, and the driving skill determiner 73. Each of these components is a functionality to be implemented by executing a computer program with one or more processors such as CPUs. Alternatively, all or part of the acquirer 61, the line-of-sight detector 63, the surrounding environment detector 65, the driving scene determiner 67, the target value setter 69, the assistance processor 71, and the driving skill determiner 73 are analog circuitry.

Acquirer

The acquirer 61 acquires measurement information on the surrounding environment of the vehicle 1 measured by the surrounding environment sensor 31 in a predetermined sampling cycle. In the present embodiment, the acquirer 61 acquires the image data transmitted from the front imaging cameras 31LF and 31RF and the rear imaging camera 31R. In a case where the surrounding environment sensor 31 includes a sensor such as a LiDAR sensor or a radar sensor other than the front imaging cameras 31LF and 31RF and the rear imaging camera 31R, the acquirer 61 acquires the measurement information such as point group data on measurement points from each of the sensors. The acquirer 61 acquires the position information on the vehicle 1 outputted from the vehicle position sensor 35.

Line-of-sight Detector

The line-of-sight detector 63 detects a line of sight of the driver who drives the vehicle 1, based on the image data transmitted from the driver monitoring camera 37. Specifically, the line-of-sight detector 63 identifies the face of the driver and detects the eyes and pupils of the driver, based on feature points extracted from the image data, to thereby identify a direction of the line of sight of the driver. The line-of-sight detector 63 may simply identify a direction of the face of the driver as the direction of the line of sight of the driver.

Surrounding Environment Detector

The surrounding environment detector 65 detects the surrounding environment of the vehicle 1, based on the measurement information acquired from the surrounding environment sensor 31. For example, the surrounding environment detector 65 extracts feature points from the image data or the point group data and matches a pattern of the feature points with reference data prepared in advance, to thereby recognize an object. The surrounding environment detector 65 recognizes various kinds of objects. Examples of the objects include mobile bodies such as a person, a bicycle, a motorcycle, and a four-wheel automobile, artificial or natural static objects, and lines such as a lane line or a zebra zone drawn on a road. Further, the surrounding environment detector 65 calculates a position and a speed of the recognized object, and a distance to the object. The surrounding environment of the vehicle 1 is thereby recognized.

Alternatively, the surrounding environment sensor 31 may execute the process of recognizing these mobiles bodies and static objects. In this case, the driver assistance apparatus 50 acquires the measurement information including these recognition results from the surrounding environment sensor 31.

Driving Scene Determiner

Based on the surrounding environment of the vehicle 1 recognized by the surrounding environment detector 65, the driving scene determiner 67 detects a predetermined driving scene in which the driver is assisted in driving the vehicle 1. The predetermined driving scene is any driving scene set in advance and identified based on the information on the driving skills of the driver illustrated in FIG. 3. The driving scene determiner 67 may determine whether the vehicle 1 is to pass through the predetermined driving scene, based on the position of the vehicle 1 on the map data identified based on the position information on the vehicle 1 transmitted from the vehicle position sensor 35, a traveling direction of the vehicle 1, and the information, recorded in the map data, on the surroundings of the vehicle 1 present in the traveling direction of the vehicle 1, as well as the surrounding environment of the vehicle 1 recognized by the surrounding environment detector 65.

Target Value Setter

When the driver is to pass through the predetermined driving scene, the target value setter 69 sets a target value of at least one vehicle state related to the driving action of the driver in the predetermined driving scene, based on the information associated with the multiple skill items regarding the driving action of the driver in the predetermined driving scene. In the present embodiment, the target value setter 69 set the target value of at least one vehicle state, based on the levels of one or more skill items to be performed by the driver in the predetermined driving scene, referring to the level map held in the level map memory.

For example, in the driving scene of left-turning at the T-junction with the blind spot in the right-turning direction, the target value setter 69 sets target values (an inclination θ_N*M of the vehicle 1 in the longitudinal direction and a position xy_N*M of the vehicle 1) that further improve the current levels of the skill items of the driver, referring to the level map illustrated in FIG. 4. In this case, the target value setter 69 sets the target values, based on the information on the results of improvement in driving skill owing to the past execution of the driver assistance process for the driver in this driving scene.

Specifically, in the driving scene of left-turning at the T-junction with the blind spot in the right-turning direction, in order to eventually improve both of the skill items of the smoothness and the visibility assurance to the highest levels in a small number of execution times, it is preferable for some drivers to improve the level of the smoothness preferentially over the level of the visibility assurance, while it is preferable for other drivers to improve the level of the visibility assurance preferentially over the level of the smoothness. It is preferable for still other drivers to improve the levels of the smoothness and the visibility assurance at the same time. The target value setter 69 therefore determines the tendency of improvement in driving skill of the driver, based on the information, illustrated in FIG. 6, on the results of improvement in driving skill of the driver owing to the past execution of the driver assistance process for the driver, and gradually brings each target value toward a value of the vehicle state caused by a skilled driver having a high driving skill to allow the levels of the skill items to eventually reach the highest target values in a small number of execution times.

Assistance Processor

Based on the target value of the vehicle state set by the target value setter 69, the assistance processor 71 executes the driver assistance process to assist the driver in driving the vehicle 1. In the present embodiment, the assistance processor 71 causes the notifier 43 to output a notification that guides the vehicle state toward the target value. For example, in the driving scene of left-turning at the T-junction with the blind spot in the right-turning direction, the assistance processor 71 issues a notification that presents an operation direction of the steering wheel 13 and an acceleration or deceleration operation to cause the vehicle state to reach the set target value (the inclination θ_N*M of the vehicle 1 in the longitudinal direction and the position xy_N*M of the vehicle 1). The assistance processor 71 issues a predetermined notification to a user by outputting sounds or voices or displaying an images or texts.

Driving Skill Determiner

The driving skill determiner 73 executes a process of evaluating the driving skill of the driver. The driving skill determiner 73 evaluates the level of each skill item of the driver to be performed in the predetermined driving scene. The driving skill determiner 73 updates the information on driving skill of the driver held in the drivers' driving skill memory 57 by reflecting the information obtained as a result of the evaluation of the skill items on the information held in the drivers' driving skill memory 57. For example, after the vehicle 1 passes through the driving scene of left-turning at the T-junction with the blind spot in the right-turning direction, the driving skill determiner 73 evaluates the level of the skill item of the visibility assurance and the level of the skill item of the smoothness of the vehicle 1, in accordance with a predetermined method.

3. Operation Example

Next, a specific description will be given of an exemplary operation of the driver assistance process to be performed by the driver assistance apparatus 50 according to the present embodiment. In the following description, the driving scene of left-turning at the T-junction is exemplified as a predetermined driving scene where the driver assistance is executed.

3-1. Driver Assistance Process

FIGS. 7 and 8 are flowcharts illustrating an exemplary operation of the processor 51 of the driver assistance apparatus 50.

When the processor 51 detects that the system including the driver assistance apparatus 50 has started up (Step S11), the driving scene determiner 67 estimates a scheduled behavior of the vehicle 1 (Step S13). The processor 51 may detect that the driver assistance functionality has started, based on an instruction inputted by the user, instead of detecting that the system has started up.

The scheduled behavior of the vehicle 1 is a scheduled traveling route of the vehicle 1 or a scheduled driving operation such as an acceleration operation, a deceleration operation, or a turning operation. The driving scene determiner 67 estimates the scheduled behavior of the vehicle 1, based on one or more pieces of information of the measurement information transmitted from the surrounding environment sensor 31, the vehicle state information outputted from the vehicle state sensor 33, and road information on a road present in the traveling direction of the vehicle 1 identified based on the position information on the vehicle 1 transmitted from the vehicle position sensor 35 and the map data. Alternatively, the driving scene determiner 67 may determine the scheduled behavior of the vehicle 1, based on the information on the scheduled traveling route of the vehicle 1 received from a non-illustrated navigation system.

Thereafter, the driving scene determiner 67 determines whether the vehicle 1 is to travel in the predetermined driving scene set in advance, based on the estimated scheduled behavior of the vehicle 1 (Step S15). As illustrated in FIG. 3, for example, predetermined driving scenes where the driver is assisted in driving the vehicle 1 are set in advance, and the driving scene determiner 67 determines whether the estimated scheduled behavior of the vehicle 1 corresponds to any one of the predetermined driving scenes.

When determining that the vehicle 1 is not to travel in the predetermined driving scene (S15: NO), the driving scene determiner 67 returns the process to Step S13. In contrast, when determining that the vehicle 1 is to travel in the predetermined driving scene (S15: YES), the driving scene determiner 67 collects information on the surrounding environment of the vehicle 1 (Step S17). The information on the surrounding environment of the vehicle 1 includes information necessary for each predetermined driving scene, such as information on the surroundings that would influence traveling of the vehicle 1 in the driving scene. Examples of the information necessary for each predetermined driving scene include the information on a road on which the vehicle 1 is currently traveling or the vehicle 1 is to travel, and the information on objects present around the vehicle 1.

In the driving scene of left-turning at the T-junction, for example, the driving scene determiner 67 collects, as the information on the surrounding environment of the vehicle 1, information on the width of the traveling road R1, information on the width of the merging road R2, information on a position of the boundary between the traveling road R1 and the merging road R2, the information on the objects present around the vehicle 1, and information on a dead angle region of the merging road R2. The information on the widths of the traveling road R1 and the merging road R2 and the information on the position of the boundary between the traveling road R1 and the merging road R2 are calculated based on the measurement information received from the surrounding environment sensor 31.

The information on the objects present around the vehicle 1 includes information on a kind, a position, a moving speed, and a size of each object, and is calculated based on the measurement information transmitted from the surrounding environment sensor 31 and the information included in the map data. Examples of the objects present around the vehicle 1 include a mobile body such as a person, a bicycle, an automobile, and a four-wheel automobile, and artificial or natural static objects. The information on the objects includes information on a position of each object, a distance from each object to the vehicle 1, and a speed of each object relative to the vehicle 1.

The information on the dead angle region of the merging road R2 is calculated based on the position and size of the object present within a predetermined distance from a merging point between the traveling road R1 and the merging road R2. In the present embodiment, as illustrated in FIG. 9, used as the information on the dead angle region is information on a rate of a region DS (a rate of the dead angle region) which is a blind spot formed by an object OB as seen from a predetermined position on the traveling road R1 with respect to a region defined by a first distance L1 and a second distance L2, where the first distance L1 extends from a right end of the boundary between the traveling road R1 and the merging road R2 in an extending direction of the merging road R2, and the second distance L2 extends from the right end of the boundary in a width direction of the merging road R2.

Thereafter, the target value setter 69 acquires the information on the skill level of each skill item in the traveling of the predetermined driving scene (Step S19). Specifically, the target value setter 69 refers to the drivers' driving skill memory 57 to acquire the information on the skill level of each skill item that is recorded in association with the driver and that is to be used in the driving scene of left-turning at the T-junction. In the present embodiment of the driver who drives the vehicle 1, the target value setter 69 acquires the information on the skill levels of the skill items each of which is set on a scale of 1 to 10.

For example, when the vehicle 1 is to travel in the predetermined driving scene for the first time and thus no skill level has been recorded, the target value setter 69 may estimate the skill level of the driver, based on answers to a questionnaire about driving characteristics inputted by the driver with an appropriate input means. Alternatively, the target value setter 69 may estimate the skill level of the driver, based on the vehicle state information collected during driving of the vehicle 1.

The target value setter 69 calculates a feature quantity of the face of the driver, based on the image data transmitted from the driver monitoring camera 37, and identifies the driver who drives the vehicle 1, referring to non-illustrated data including the feature quantity of the face. Alternatively, the target value setter 69 may identify the driver who drives the vehicle 1, based on information to identify the driver inputted with an appropriate input means.

Thereafter, the target value setter 69 sets the target value of the driving operation in traveling in the predetermined driving scene (Step S21). The target value setter 69 sets the target value of the driving operation in accordance with the skill level of the driver, based on: the level map that is recorded in the level map memory 59 and corresponds to the driving scene of left-turning at the T-junction; and the information on the results of improvement in driving skill of the driver owing to the past execution of the driving assistance process for the driver in the predetermined driving scene.

Specifically, as in the example illustrated in FIG. 4, for a driver (N, M=n, m) whose skill level N of the visibility assurance is n and whose skill level M of the smoothness is m, the target value setter 69 sets, as the target values, an inclination θ_n+1*m+1 of the vehicle 1 and a position xy_n+1*m+1 of the vehicle 1 that are in a cell (N, M=n+1, m+1) where the skill levels are higher than those of the driver by one level.

After such a setting of the target values is repeated, the driving skill of each driver tends to improve. As in the example illustrated in FIG. 6, the tendency is recorded as the information on the results of improvement in driving skill. Accordingly, to efficiently improve all the skill levels in accordance with the tendency of each driver, the target value setter 69 sets the target value, based on the information on the results of improvement in driving skill of each driver.

In the driving scene of left-turning at the T-junction, the target value setter 69 sets the target values of the inclination θ of the vehicle 1 and the position xy of the vehicle 1 at the time of a temporal stop of the vehicle 1 before merging of the vehicle 1 from the traveling road R1 into the merging road R2. For example, as in the example illustrated in FIG. 6, the skill level M of the smoothness of the driver A tends to improve fast. Based on the tendency, the target value setter 69 sets the target value that further improves the level of a first skill item of the multiple skill items having been improved faster than the level of another skill item owing to the past driver assistance process. Specifically, for the driver A having the skill levels n and m (N, M=n, m), the target value setter 69 sets, as the target values, an inclination θ_n*m+1 of the vehicle 1 and a position xy_n*m+1 of the vehicle 1 that are in a cell (N, M=n, m+1) where only the skill level M of the smoothness is higher than that of the driver A.

Further, when the level of the first skill item, which is one of the multiple skill items and has been improved faster than the level of the other skill item owing to the past driver assistance process, slows down in improvement, the target value setter 69 sets the target value that improves the level of the other skill item other than the first skill item. Specifically, when the skill level M of the smoothness slows down in improvement after reaching a predetermined level (e.g., 7), the target value setter 69 sets, as the target values, the inclination θ_n+1*m+1 of the vehicle 1 and the position xy_n+1*m+1 of the vehicle 1 that are in a cell (N, M=n+1, m+1) where the skill level N of the visibility assurance is higher than that of the driver.

Further, as in the example illustrated in FIG. 6, the skill level M of the smoothness of the driver B tends to improve fast in an initial stage of execution of the driver assistance, and the skill level N of the visibility assurance tends to improve in the third and later execution of the driver assistance. Accordingly, for the driver B having the skill levels n and m (N, M=n, m), the target value setter 69 sets, as the target values, the inclination θ_n+1*m+1 of the vehicle 1 and the position xy_n+1*m+1 of the vehicle 1 that are in the cell where the skill levels N and M are higher than those of the driver B, in the fifth and later execution of the driver assistance.

As described above, the target value setter 69 sets the target values, based on the information on the results of improvement in driving skill of the driver, and the current skill levels of the driver. When setting the target values, the target value setter 69 may set the target values, referring to a cell where the skill levels are higher than those of the driver by several levels, rather than a cell where the skill levels are higher than those of the driver by one level.

In contrast, when the improvement in the levels of the skill items is significantly slow or when the levels of the skill items have not improved for a long time despite repeated execution of the driver assistance process, the target value setter 69 sets target skill levels to values in a cell where the skill levels are lower by one or more levels to let the driver get used to the driving operation of a low skill level. This actually makes it possible to improve the driving skills of the drivers faster than in a case where the drivers are repeatedly assigned driving operations of a high skill level. The pace of improvement of the level of the skill item and the time during which the level of the skill item is not improved may be determined based on any determination reference.

Thereafter, the assistance processor 71 acquires information on the vehicle state (Step S23). In the driving scene of left-turning at the T-junction, the assistance processor 71 calculates a current inclination θ and a current position xy of the vehicle 1 and acquires information on a current speed and a current steering angle of the vehicle 1.

Thereafter, the assistance processor 71 outputs information that assists driving of the vehicle 1, based on the acquired information on the vehicle state and the information on the target value set by the target value setter 69 (Step S25). In the driving scene of left-turning at the T-junction, the assistance processor 71 calculates a target steering angle of the vehicle 1 and a target acceleration or deceleration rate of the vehicle 1 to achieve the inclination θ and the position xy of the vehicle 1 set as the target values. The assistance processor 71 causes the notifier 43 to issue the notification that presents an operation direction of the steering wheel 13 and an acceleration or deceleration operation. The assistance processor 71 may causes the notifier 43 to notify a specific steering angle and a specific acceleration or deceleration operation amount in addition to the operation direction and the acceleration or deceleration operation of the steering wheel 13.

Thereafter, the assistance processor 71 determines whether the set target values are feasible (Step S27). In the driving scene of left-turning at the T-junction, the assistance processor 71 acquires the current inclination θ and the current position xy of the vehicle 1 again to determine whether the inclination θ and the position xy set as the target values are feasible. For example, the assistance processor 71 determines that the target values are infeasible when determining that the inclination θ and the position xy set as the target values are not feasible in terms of time or vehicle state, based on the current inclination θ and the current position xy of the vehicle 1, and the inclination θ and the position xy of the vehicle 1 set as the target values.

When determining that the set target values are infeasible (S27: NO), the assistance processor 71 returns the process to Step S17. In this case, the driving scene determiner 67 collects the information on the surrounding environment again (Step S17), and the target value setter 69 sets target values that are feasible, based on the current vehicle state (Steps S19 to S21). The assistance processor 71 outputs the information that assists driving of the vehicle 1, based on the information on the current vehicle state and the information on the target values (Steps S23 to S25).

In contrast, when determining that the set target values are feasible (S27: YES), the assistance processor 71 determines whether to end the assistance process (Step S29). For example, the assistance processor 71 determines that the assistance process is to end when the vehicle 1 has passed through a predetermined position corresponding to the target values or when the vehicle 1 has passed through the predetermined driving scene where the driver assistance has been executed. When determining that the assistance process is not to end (S29: NO), the assistance processor 71 repeats the determination at Step S29. In contrast, when determining that the assistance process is to end (S29: YES), the assistance processor 71 determines whether to stop the system (Step S31). For example, the assistance processor 71 may determine whether to stop the system in accordance with an input operation performed by the driver who drives the vehicle 1 to stop the driver assistance functionality. When determining that the system is not to stop (S31: NO), the assistance processor 71 returns the process to Step S13 and executes the processing in each of the steps described above. In contrast, when determining that the system is to stop (S31: YES), the assistance processor 71 ends a series of the processing.

3-2. Driving Skill Evaluation Process

Next, a description will be given of a driving skill evaluation process to be performed by the driving skill determiner 73. FIG. 10 is a flowchart of the driving skill evaluation process in which the driving skill of the driver in the driving scene of left-turning at the T-junction is evaluated.

The driving skill determiner 73 determines whether the vehicle 1 has started passing through the predetermined driving scene (Step S41). For example, the driving skill determiner 73 determines that the vehicle 1 has started passing through the predetermined driving scene when receiving the information, acquired by the driving scene determiner 67 in Step S15 described above, indicating that the vehicle 1 is traveling in the predetermined driving scene.

When the driving skill determiner 73 determines that the vehicle 1 has not started passing through the predetermined driving scene (S41: NO), the determination at Step S41 is repeated. In contrast, when determining that the vehicle 1 has started passing through the predetermined driving scene (S41: YES), the driving skill determiner 73 starts a process of recording the vehicle state information (Step S43). In the driving scene of left-turning at the T-junction, the driving skill determiner 73 starts recording information on a steering angle θs of the steering wheel 13, information on a distance L to the boundary between the traveling road R1 and the merging road R2, and information on a rate Rd of the dead angle region.

Thereafter, the driving skill determiner 73 determines whether the vehicle 1 has passed through the predetermined driving scene (Step S45). Here, the driving skill determiner 73 determines whether the vehicle 1 has turned left at the T-junction and merged into the merging road R2. For example, the driving skill determiner 73 determines whether the vehicle 1 has merged into the merging road R2, based on the position information detected by the vehicle position sensor 35 and the map data. Alternatively, the driving skill determiner 73 may determine that the vehicle 1 has merged into the merging road R2 when the steering wheel 13 has been turned forward once and then turned back to cause the vehicle 1 to travel straight.

When determining that the vehicle has not passed through the predetermined driving scene (S45: NO), the driving skill determiner 73 repeats the recording process at Step S43 and the determination process at Step S45. In contrast, when determining that the vehicle 1 has passed through the predetermined driving scene (S45: YES), the driving skill determiner 73 evaluates the skill level N of the skill item of the visibility assurance (Step S47).

FIG. 11 is a flowchart of an example of the process of evaluating the skill level N of the visibility assurance in the driving scene of left-turning at the T-junction. The flowchart illustrated in FIG. 11 includes Step S43 described above in which the process of recording the vehicle state is performed.

The driving skill determiner 73 calculates, as the vehicle state information, the distance L from the vehicle 1 to the boundary between the traveling road R1 and the merging road R2 (Step S51). The distance L may be a distance from the center of gravity of the vehicle 1 or any position set on the central portion of the frontal edge of the vehicle 1 to the boundary. The driving skill determiner 73 calculates the distance L, based on the information on the surrounding environment recognized based on the measurement information detected by the surrounding environment sensor 31.

Thereafter, the driving skill determiner 73 determines whether the distance L from the vehicle 1 to the boundary between the traveling road R1 and the merging road R2 has become less than or equal to a predetermined threshold L0 (Step S53). The threshold L0 of the distance L is a threshold at which the calculation of the rate Rd of the dead angle region is started, and may be set to any value, for example, 10 m.

When determining that the distance L has not become less than or equal to the predetermined threshold L0 (S53: NO), the driving skill determiner 73 returns the process to Step S51 and repeats the determination regarding the distance L until the distance L becomes less than or equal to the predetermined threshold L0. In contrast, when determining that the distance L has become less than or equal to the predetermined threshold L0 (S53: YES), the driving skill determiner 73 determines whether the driver who drives the vehicle 1 is looking in a direction of the dead angle region (Step S55). Specifically, the driving skill determiner 73 determines whether the driver is looking in the direction of the dead angle region, based on the information on the dead angle region collected in Step S17 described above and the information on the line of sight of the driver detected by the line-of-sight detector 63.

When determining that the driver who drives the vehicle 1 is not looking in the direction of the dead angle region (S55: NO), the driving skill determiner 73 repeats the determination at Step S55. In contrast, when determining that the driver who drives the vehicle 1 is looking in the direction of the dead angle region (S55: YES), the driving skill determiner 73 calculates the rate Rd of the dead angle region (Step S57). As described above, the rate of the dead angle region DS is the rate of the region that is the blind spot formed by the object OB as seen from the predetermined position on the traveling road R1 with respect to the region (reference region) defined by the first distance L1 and the second distance L2, where the first distance L1 extends in the extending direction of the merging road R2 from the right end of the boundary between the traveling road R1 and the merging road R2, and the second distance L2 extends in the width direction from the right end of the boundary in the width direction of the merging road R2. The distance L1 is, for example, 50 m, and the distance L2 is, for example, 10 m. However, the distances L1 and L2 may be each set to any value taking into consideration viewability of another vehicle approaching from the right side of the merging road R2.

An area of the dead angle region DS of the region described above may be calculated based on a position of the face of the driver who drives the vehicle 1, a position of the object OB forming the blind spot, a distance from the position of the face of the driver to the position of the object OB, and a size of the object OB as seen from the driver. The driving skill determiner 73 determines the rate (area ratio) Rd of the dead angle region by dividing the calculated area of the dead angle region DS by the reference region.

Thereafter, the driving skill determiner 73 determines whether a difference ΔRd between a rate Rd(t−1) of the dead angle region obtained in immediately preceding calculation and a rate Rd(t) of the dead angle region obtained in current calculation is less than or equal to a predetermined threshold ΔRd_0 (Step S59). In Step S59, it is determined whether the driver who drives the vehicle 1 is looking at the dead angle region DS while making a temporal stop of the vehicle 1 or driving the vehicle 1 slowly. When determining that the driver is looking at the dead angle region DS while making a temporal stop of the vehicle 1, the threshold ΔRd_0 is set to zero. However, it is desirable to set the threshold ΔRd_0 to an appropriate value greater than zero, because many drivers look at the dead angle region DS while driving the vehicle 1 slowly rather than completely stopping the vehicle 1.

When the driving skill determiner 73 determines that the difference ΔRd between the rates Rd of the dead angle region is not less than or equal to the threshold ΔRd_0 (S59: NO), it is assumed that the driver is looking at the dead angle region DS without stopping the vehicle 1 or without slowing down the vehicle 1, that is, it is assumed that the driver is making an unsafety viewing behavior. In this case, the driving skill determiner 73 causes the process to proceed to Step S63 without recording the rate Rd of the dead angle region. In contrast, when determining that the difference ΔRd between the rates Rd of the dead angle region is less than or equal to the threshold ΔRd_0 (S59: YES), the driving skill determiner 73 records the rate Rd of the dead angle region (Step S61). That is, since the difference ΔRd between the rates Rd of the dead angle region is small, it is assumed that the driver is looking in the direction of the dead angle region DS while stopping or slowing down the vehicle 1, that is, it is assumed that the driver is making a safety viewing behavior. Accordingly, information regarding how much area of the dead angle region the driver who drives the vehicle 1 is visually recognizing while making the viewing behavior is recorded.

Thereafter, the driving skill determiner 73 determines whether the rate Rd of the dead angle region has become zero (Step S63). That is, the driving skill determiner 73 determines whether the vehicle 1 has started entering the merging road R2. When determining that the rate Rd of the dead angle region has not become zero (S63: NO), the driving skill determiner 73 returns the process to Step S55 and continues the determination as to whether the driver is looking in the direction of the dead angle region (Step S55) and the calculation and recording of the rate Rd of the dead angle region (Steps S57 to Step S61). In contrast, when determining that the rate Rd of the dead angle region has become zero (S63: YES), the driving skill determiner 73 evaluates the skill level N of the visibility assurance, based on the recorded information on the rate Rd of the dead angle region (Step S65).

FIGS. 12 to 15 are diagrams illustrating a method of evaluating the skill level N of the visibility assurance. As apparent from a comparison between FIG. 9 described above and FIG. 12, the rate Rd of the dead angle region DS formed by the object OB with respect to the reference region varies depending on the position of the vehicle 1. When the driver is making the viewing behavior at a position where the rate Rd of the dead angle region is large before the vehicle 1 merges into the merging road R2, it is assumed that the skill level of the visibility assurance of the driver is low. Accordingly, in the present embodiment, the driving skill determiner 73 acquires the rate Rd of the dead angle region DS in a time when a change in the rate Rd of the dead angle region is small, from the time when the distance L from the vehicle 1 to the boundary becomes less than or equal to the threshold L0 to the time when the vehicle 1 starts entering the merging road R2, and determines that the skill level of the visibility assurance is higher as the rate Rd is smaller.

FIGS. 13 and 14 are explanatory diagrams each illustrating the viewing behaviors made by drivers having different skill levels N of the visibility assurance before entering the merging road R2. Each of the diagrams has a horizontal axis representing time, and a vertical axis representing the rate Rd of the dead angle region as seen from the position of the vehicle 1. Each shaded region indicates the rate Rd of the dead angle region in a time period in which the driver made the viewing behavior. That is, an area of the shaded region corresponds to an integrated value of the rates Rd of the dead angle region in the time period in which the driver made the viewing behavior from the time when the distance L from the vehicle 1 to the boundary become less than or equal to the threshold L0 to the time when the vehicle 1 entered the merging road R2.

As illustrated in FIG. 13, a driver having a low skill level of the visibility assurance enters the merging road R2 at a time t5 after making the viewing behavior multiple times at positions where the rate Rd of the dead angle region is high in a time period from t1 to t2 and a time period from t3 to t4. A driver having a middle skill level of the visibility assurance enters the merging road R2 at a time t13 after making the viewing behavior at positions where the rate Rd of the dead angle region is high in a time period from t11 to t12.

As illustrated in FIG. 14, a driver having a high skill level of the visibility assurance enters the merging road R2 at a time t25 after making the viewing behavior multiple times at positions where the rate Rd of the dead angle region is low in a time period from t21 to t22 and a time period from t23 to t24. Further, a driver having a high skill level of the visibility assurance enters the merging road R2 at a time t33 after making the viewing behavior at positions where the rate Rd of the dead angle region is low in a time period from t31 to t32.

A reason why the condition that the driver is looking in the direction of the dead angle region is set is to avoid a false recognition of a state where the vehicle 1 is stopping or running slowly due to another factor such as a bicycle cutting across in front of the vehicle 1 as a state where the driver is making the viewing behavior. Further, a reason why the condition that the driver is continuously looking in the direction of the dead angle region is set is to avoid a false recognition of a state where the vehicle 1 keeps staying at a position where the driver has looked in the direction of the dead angle region due to another factor as the state where the driver is making the viewing behavior.

FIG. 15 illustrates an example of distribution data on the integrated value ΣRd of the rates Rd of the dead angle region in the time period in which the drivers having different skill levels made the viewing behaviors while turning left at the T-junction. A horizontal axis indicates the integrated value ΣRd of the rates Rd of the dead angle region in the time period in which the drivers made the viewing behaviors, and a vertical axis indicates the number of the drivers concerned. In the distribution data illustrated in FIG. 15, the number of the drivers is small in a region in which the integrated value ΣRd of the rates Rd of the dead angle region in the time period in which the viewing behaviors were made is small and a region in which the integrated value ΣRd of the rates Rd of the dead angle region in the time period in which the viewing behaviors were made is large, and increases as the integrated value ΣRd of the rates Rd of the dead angle region in the time period in which the viewing behaviors were made comes closer to a median. The distribution data is collected in advance. The range of the integrated value ΣRd of the rates Rd of the dead angle region in the time period in which the viewing behaviors were made is sectioned in accordance with the number of skill levels. One of the sections in which the integrated value ΣRd is largest is rated as a lowest skill level (1), and another of the sections in which the integrated value ΣRd is smallest is rated as a highest skill level (10).

In Step S65 described above, the driving skill determiner 73 determines the integrated value ΣRd of the rates Rd of the dead angle region in the time period in which the viewing behaviors were made, based on the recorded data on the rates Rd, and evaluates the skill level N of the visibility assurance of the driver, referring to the distribution data held in advance. Based on the information on a result of the evaluation of the skill level N, the driving skill determiner 73 updates the skill level N, held in the drivers' driving skill memory 57, of the visibility assurance of the driver in the driving scene of left-turning at the T-junction.

In the example illustrated in FIG. 11, the information on the rate Rd of the dead angle region is used as an index based on which the skill level N of the visibility assurance is evaluated. However, instead of the information on the rate Rd of the dead angle region, the information on the distance L from the vehicle 1 to the boundary may be used. The distance L varies in proportion to the change in the rate Rd of the dead angle region. Accordingly, even in the case where the information on the distance L is used, it is possible to evaluate the skill level N of the visibility assurance of the driver in a similar way.

Returning back to FIG. 10, after evaluating the skill level N of the visibility assurance in Step S47, the driving skill determiner 73 evaluates the skill level M of the skill item of the smoothness (Step S49).

FIG. 16 is a flowchart illustrating an example of the process of evaluating the skill level M of the smoothness in the driving scene of left-turning at the T-junction. The flowchart illustrated in FIG. 16 includes Step S43 described above in which the process of recording the vehicle state is performed.

The driving skill determiner 73 determines whether the vehicle 1 has started turning (Step S71). For example, the driving skill determiner 73 determines that the vehicle 1 has started turning when the vehicle 1 has started accelerating with the steering angle set to be greater than zero in a counterclockwise direction after making a temporal stop. However, the method of determining whether the vehicle 1 has started turning is not limited to the example described above. The driving skill determiner 73 may determine that the vehicle 1 has started turning when the vehicle 1 has crossed over the boundary between the traveling road R1 and the merging road R2.

When the driving skill determiner 73 determines that the vehicle 1 has not started turning (S71: NO), the determination at Step S71 is repeated. In contrast, when determining that the vehicle 1 has started turning (S71: YES), the driving skill determiner 73 counts the number of times of steering correction Nsr (Step S73). Specifically, the driving skill determiner 73 counts up the number of times of steering correction Nsr when it is determined that the steering wheel 13 has been repeatedly steered in the counterclockwise direction and a clockwise direction in a predetermined time, based on the information on the steering angle θs detected by the steering angle sensor in the predetermined sampling cycle. The number of times of steering correction Nsr continues to be counted until it is determined that the vehicle 1 has finished turning.

Thereafter, the driving skill determiner 73 records a maximum steering angular velocity dθs/dt_max (Step S75). Specifically, the driving skill determiner 73 records a maximum value of a steering angular velocity dθs/dt obtained by differentiating the steering angle θs detected by the steering angle sensor with respect to a time interval t of the sampling cycle. More specifically, the driving skill determiner 73 compares the steering angular velocity dθs/dt calculated in the predetermined sampling cycle with the maximum steering angular velocity dθs/dt_max. When the calculated steering angular velocity dθs/dt is greater than the maximum steering angular velocity dθs/dt_max, the driving skill determiner 73 repeats the process of updating the maximum steering angular velocity dθs/dt_max. The maximum steering angular velocity dθs/dt_max continues to be counted until it is determined that the vehicle 1 has finished turning.

Thereafter, the driving skill determiner 73 determines whether the vehicle 1 has finished turning (Step S77). For example, the driving skill determiner 73 determines that the vehicle 1 has finished turning when a predetermined time has elapsed or the vehicle 1 has traveled a predetermined distance after returning the steering angle to zero. However, the method of determining whether the vehicle 1 has finished turning is not limited to the example described above. The driving skill determiner 73 may determine that the vehicle 1 has finished turning when it is determined that the vehicle 1 has started traveling along the merging road R2, based on the position information on the vehicle 1 and the map data.

When determining that the vehicle 1 has not finished turning (S77: NO), the driving skill determiner 73 returns the process to Step S63 and continues counting the number of times of steering correction Nsr (Step S73) and continues recording the maximum steering angular velocity dθs/dt_max (Step S75). In contrast, when determining that the vehicle 1 has finished turning (S77: YES), the driving skill determiner 73 evaluates the skill level M of the smoothness, based on the recorded information on the number of times of steering correction Nsr and the maximum steering angular velocity dθs/dt_max (Step S79).

FIGS. 17 to 20 are explanatory diagrams illustrating the method of evaluating the skill level M of the smoothness.

Figure 17:
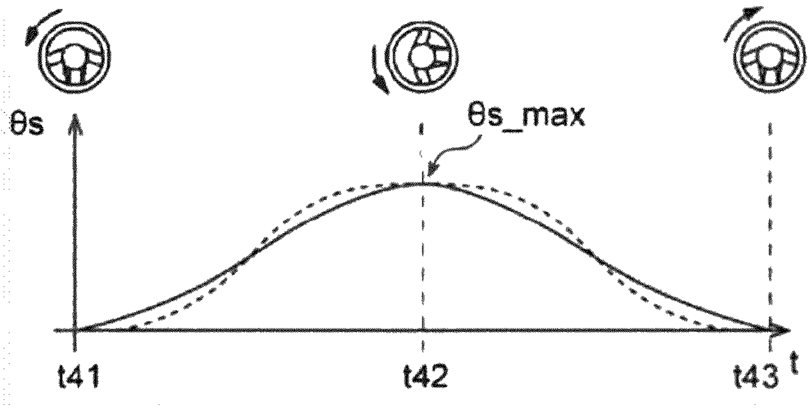
FIG. 17 is an explanatory diagram illustrating a change in steering angle from a start of turning of the vehicle to an end of turning of the vehicle in the driving scene of left-turning at the T-junction.

FIG. 17 illustrates a change in the steering angle θs from the start of turning of the vehicle 1 to the end of turning of the vehicle 1 in the driving scene of left-turning at the T-junction. A solid line indicates a change in the steering angle θs caused by a driver having a high skill level of the smoothness, and a broken line indicates a change in the steering angle θs caused by a driver having a low skill level of the smoothness. An inclination of the curve indicating the change in the steering angle θs indicates the steering angular velocity dθs/dt. It is understood that the maximum value of the steering angular velocity dθs/dt set by the driver having the high skill level is smaller than that set by the driver having the low skill level.

FIG. 18 illustrates an example of distribution data on the maximum steering angular velocity dθs/dt_max in the steering operation performed by the drivers having different skill levels M of the smoothness in the time period from the start of turning to the end of turning, and FIG. 19 illustrates an example of distribution data on the number of times of steering correction Nsw in the steering operation performed by the drivers having different skill levels M of the smoothness in the time period from the start of turning to the end of turning. FIG. 18 has a horizontal axis indicating the maximum steering angular velocity dθs/dt_max, and FIG. 19 has a horizontal axis indicating the number of times of steering correction Nsw. Each of FIGS. 18 and 19 has a vertical axis indicating the number of drivers concerned. In the distribution data illustrated in FIG. 18, a peak appears at a position of a quarter of the entire range of the maximum steering angular velocity dθs/dt_max, and in the distribution data illustrated in FIG. 19, a peak appears at a position of a quarter of the entire range of the number of times of steering correction Nsw. The number of drivers decreases in regions where a value of the maximum steering angular velocity dθs/dt_max and a value of the number of times of steering correction Nsw are large.

FIG. 20 illustrates distribution data on a value obtained by multiplying the maximum steering angular velocity dθs/dt_max included in the distribution data illustrated in FIG. 18 by the number of times of steering correction Nsw included in the distribution data illustrated in FIG. 19. In the distribution data illustrated in FIG. 20 also, a peak appears at a position of a quarter of the entire range of the value obtained by multiplying the maximum steering angular velocity dθs/dt_max by the number of times of steering correction Nsw, and the number of drivers decreases in regions where the value obtained by multiplying the maximum steering angular velocity dθs/dt_max by the number of times of steering correction Nsw is large. The distribution data is collected in advance. The range of the value obtained by multiplying the maximum steering angular velocity dθs/dt_max in the time period from the start of turning to the end of turning by the number of times of steering correction Nsw in the time period from the start of turning to the end of turning is sectioned in accordance with the number of skill levels. One of the sections in which the multiplication value is largest is rated as a lowest skill level (1), and another of the sections in which the multiplication value is smallest is rated as a highest skill level (10).

In the Step S79 described above, the driving skill determiner 73 calculates the multiplication value by multiplying the maximum steering angular velocity dθs/dt_max in the time period from the start of turning to the end of turning by the number of times of steering correction Nsw in the time period from the start of turning to the end of turning, based on the recorded information on the number of times of steering correction Nsr and the maximum steering angular velocity dθs/dt_max, and evaluates the skill level M of the smoothness referring to the distribution data held in advance. The driving skill determiner 73 updates the skill level M, held in the drivers' driving skill memory 57, of the smoothness of the driver in the driving scene of left-turning at the T-junction, based on the information on the result of evaluation of the skill level M.

In this way, the driving skill determiner 73 evaluates the skill level of each skill item each time the driver assistance control is executed for the driver and updates the information on the skill level of the driver held in the drivers' driving skill memory 57. This allows the target value to be set in the driver assistance process, based on the information on the result of improvement in the driving skill owing to the execution of the driver assistance control for each driver.

According to the present embodiment described above, the driver assistance apparatus 50 executes the target value setting process and the assistance process. In the target value setting process, the driver assistance apparatus 50 sets a target value of at least one vehicle state related to a driving action of the driver in a predetermined driving scene, based on the information on respective skill levels of the multiple skill items regarding the driving action of the driver in the predetermined driving scene. In the assistance process, the driver assistance apparatus 50 assists the driver in driving the vehicle 1, based on the target value. In the target value setting process, the driver assistance apparatus 50 sets the target value, based on the information on the result of improvement in the driving skill owing to the past execution of the driver assistance process for the driver in the predetermined driving scene. Accordingly, it is possible to preferentially improve the skill level of any skill item, among the multiple skill items, that is easy for the driver to improve over the other skill items first, and then improve the skill levels of the other skill items. As a result, it is possible to efficiently enhance a driving skill in a predetermined driving scene.

Further, according to the present embodiment, the driver assistance apparatus 50 sets the target value, based on the information on the skill levels and the information on the level map that are generated based on the information on the vehicle states caused by the drivers having different skill levels. This allows the target value to be set based on the vehicle state caused by a driver having a skill level similar to that of an individual driver, preventing the level of difficulty in operating the vehicle 1 from increasing in accordance with the target value. As a result, it is possible to efficiently enhance the skill level. Since the level of difficulty in operating the vehicle 1 is prevented from increasing, the driver is allowed to receive the assistance while paying attention to a surrounding traffic environment.

4. Modification Examples

The driver assistance apparatus 50 described in the embodiments described above is merely exemplary, and the driver assistance apparatus 50 according to the embodiments described above may be modified in various ways. In the following, other embodiments of the driver assistance apparatus are described.

4-1. First Modification Example

In the embodiments described above, the driver assistance apparatus 50 sets the target value, referring to the level map. However, the driver assistance apparatus 50 may set the target value using a target value setting model created by machine learning. For example, the driver assistance apparatus 50 may be configured to input the skill level of the driver who drives the vehicle 1 to be assisted to the target value setting model created by machine learning that is based on learning data including the information on the respective skill levels of the skill items of drivers having different skill levels, the information on the set target values, and the information on the results of improvement driving skill owing to the execution of the driver assistance process (information on transition of the skill levels), to thereby obtain an output of a target value that makes it possible to improve the skill level. In this way, the direction of improvement in the skill level that is not assumable in the case using the level map may be found out, and as a result, it is possible to set the target value that efficiently improves the skill level.

4-2. Second Modification Example

In the embodiments described above, the indices for evaluating the skill item in the predetermined driving scene (the distance L from the vehicle 1 to the boundary and the rate Rd of the dead angle region, or the skill levels of the maximum steering angular velocity dθs/st_max and the number of times of steering correction Nsr) are set in advance. Alternatively, instead of setting the indices (skill levels), the target value setting model may be created by learning the information on the vehicle state. For example, the information on each skill item is inputted to an index learning model created by machine learning that is based on the learning data including the information on the vehicle states related to the respective skill items of the drivers having different driving skills and the information on the driving skills of the drivers, to thereby obtain an output of an index that evaluates the skill item. Further, the information on the index of the driver who drives the vehicle 1 to be assisted is inputted to the target value setting model created by machine learning that is based on learning data including the output of the index learning model and the information on the improvement in driving skill of the drivers owing to the execution of the driver assistance process, to thereby obtain the output of the target value that makes it possible to improve the level of the skill item. This allows for setting of the target value that is not assumable by a designer who designes reference data of the target value, allowing for setting of the target value that makes it possible to further efficiently improve the driving skill of the driver.

4-3. Third Modification Example

In the foregoing embodiments, the notification is issued via the notifier 43 in the driver assistance process performed by the assistance processor 71; however, the technology of the disclosure is not limited to the above-described example. For example, the assistance processor 71 may generate a command value of the steering angle, the acceleration rate, or the deceleration rate to achieve the set target value, transmit the command value to the vehicle controller 41, and temporarily perform automated control of the steering angle, the acceleration rate, and the deceleration rate. This enhances the sense of security of the driver who drives the vehicle 1 to the driver assistance apparatus 50 and facilitates the use of the driver assistance apparatus 50.

Although some preferred embodiments of the invention have been described so far with reference to the accompanying drawings, the invention is by no means limited to the embodiments described above. It is apparent that modifications and alterations may be made by persons having ordinary knowledge in a technical field to which the invention belongs to within the scope of the technical concept set forth in the claims. It is naturally appreciated that these modifications and alterations also belong to the technical field of the invention.

For example, in the foregoing embodiments, the driver assistance apparatus is an electronic control unit mounted in the vehicle; however, the technology of the disclosure is not limited to the above-described example. For example, the driver assistance apparatus may be configured to acquire the measurement information from the vehicle surrounding environment sensor and may be a portable device or an external server configured to transmit a drive command signal to the notifier.

Further, the technology of the disclosure may be implemented as a vehicle equipped with the driver assistance apparatus described in the foregoing embodiments, a driver assistance method by the driver assistance apparatus, a computer program that causes a computer to serve as the driver assistance apparatus, and a non-transitory tangible recording medium in which the computer program is recorded.

DESCRIPTION OF REFERENCE NUMERALS

1: Vehicle
31: Surrounding environment sensor
33: Vehicle state sensor
35: Vehicle position sensor
37: Driver monitoring camera
41: Vehicle controller
43: Notifier
50: Driver assistance apparatus
51: Processor
53: Memory
55: Map data memory
57: Drivers' driving skill memory
59: Level map memory
61: Acquirer
63: Line-of-sight detector
65: Surrounding environment detector
67: Driving scene determiner
69: Target value setter
71: Assistance processor
73: Driving skill determiner

The invention claimed is:

1. A driver assistance apparatus configured to assist a driver in driving a vehicle, the driver assistance apparatus comprising:

one or more processors; and one or more memories communicably coupled to the one or more processors, wherein the one or more processors are configured to execute;

a target value setting process of setting, based on information associated with multiple skill items regarding a driving action of the driver in a predetermined driving scene, a target value of at least one vehicle state related to the driving action of the driver in the predetermined driving scene, the information associated with the multiple skill items comprising information on respective levels of the multiple skill items; and an assistance process of assisting the driver in driving the vehicle, based on the target value, wherein in the target value setting process, the one or more processors are configured to set the target value based on information on a result of improvement of a driving skill of the driver resulting from past execution of the assistance process for the driver in the predetermined driving scene, the information on the result of improvement comprising, for each of the multiple skill items, a corresponding level before the past execution of the assistance process in the predetermined driving scene and a corresponding level after the past execution of the assistance process in the predetermined driving scene.

2. The driver assistance apparatus according to claim 1, wherein the one or more processors are configured to gradually bring the target value toward a value of the vehicle state caused by a skilled driver having the driving skill at a high level.

3. The driver assistance apparatus according to claim 2, wherein the one or more processors are configured to set the target value that further improves a level of a first skill item of the multiple skill items, the level of the first skill item having been improved faster than a level of another skill item of the multiple skill items owing to the past execution of the assistance process.

4. The driver assistance apparatus according to claim 3, wherein, when the level of the first skill item of the multiple skill items having been improved faster than the level of the other skill item owing to the past execution of the assistance process slows down in improvement, the one or more processors are configured to set the target value that improves the level of the other skill item other than the first skill item.

5. The driver assistance apparatus according to claim 1, comprising a level map memory that holds a level map associated with the information on the respective levels of the multiple skill items for each of the at least one predetermined driving scene, the level map including information on the at least one vehicle state related to the driving action of the driver having the respective levels of the multiple skill items, wherein the one or more processors are configured to set the target value, referring to the level map and based on the information on the respective levels of the multiple skill items of the driver and the information on the result of improvement in the driving skill owing to the past execution of the assistance process.

6. The driver assistance apparatus according to claim 1, wherein the one or more processors are configured to determine whether the vehicle is to travel in the predetermined driving scene, based on an estimated scheduled behavior of the vehicle.

7. The driver assistance apparatus according to claim 1, wherein the one or more processors are configured to determine whether the vehicle is to pass through the predetermined driving scene, based on a position of the vehicle, a traveling direction of the vehicle, map data, and information on a surrounding environment of the vehicle.

8. The driver assistance apparatus according to claim 1, wherein, when the target value is not feasible, the one or more processors are configured to:

collect information on a surrounding environment of the vehicle again; and set a feasible target value based on a current vehicle state of the vehicle.

9. A driver assistance method of assisting a driver in driving a vehicle, the driver assistance method comprising:

assisting the driver in driving the vehicle by setting, based on information associated with multiple skill items regarding a driving action of the driver in a predetermined driving scene, a target value of at least one vehicle state related to the driving action of the driver in the predetermined driving scene, the information associated with the multiple skill items comprising information on respective levels of the multiple skill items; and setting the target value based on information on a result of improvement of a driving skill of the driver resulting from past execution of assistance process for the driver in the predetermined driving scene, the information on the result of improvement comprising, for each of the multiple skill items, a corresponding level before the past execution of the assistance process in the predetermined driving scene and a corresponding level after the past execution of the assistance process in the predetermined driving scene.

10. A non-transitory tangible recording medium containing a computer program, the computer program causing one or more processors to:

assist a driver in driving a vehicle by setting, based on information associated with multiple skill items regarding a driving action of the driver in a predetermined driving scene, a target value of at least one vehicle state related to the driving action of the driver in the predetermined driving scene, the information associated with the multiple skill items comprising information on respective levels of the multiple skill items; and set the target value based on information on a result of improvement of a driving skill of the driver resulting from past execution of assistance process for the driver in the predetermined driving scene, the information on the result of improvement comprising, for each of the multiple skill items, a corresponding level before the past execution of the assistance process in the predetermined driving scene and a corresponding level after the past execution of the assistance process in the predetermined driving scene.

* * * * *